(12) United States Patent
Shakkarwar

(10) Patent No.: US 10,592,902 B2
(45) Date of Patent: Mar. 17, 2020

(54) SYSTEMS AND METHODS FOR ENHANCED TRANSACTION PROCESSING

(75) Inventor: Rajesh G. Shakkarwar, Cupertino, CA (US)

(73) Assignee: VERIENT INC., San Jose, CA (US)

( * ) Notice: Subject to any disclaimer, the term of this patent is extended or adjusted under 35 U.S.C. 154(b) by 160 days.

(21) Appl. No.: 13/011,816

(22) Filed: Jan. 21, 2011

(65) Prior Publication Data

US 2011/0184866 A1 Jul. 28, 2011

Related U.S. Application Data

(60) Provisional application No. 61/297,642, filed on Jan. 22, 2010.

(51) Int. Cl.
*G06Q 20/40* (2012.01)

(52) U.S. Cl.
CPC .................... *G06Q 20/40* (2013.01)

(58) Field of Classification Search
CPC ........ G06Q 10/00; G06Q 20/00; G06Q 30/00; G06Q 40/00
USPC ....................................... 705/3-44
See application file for complete search history.

(56) References Cited

U.S. PATENT DOCUMENTS

| | | | | |
|---|---|---|---|---|
| 6,727,531 B1 * | 4/2004 | Redwing et al. | ............. | 257/194 |
| 7,050,996 B1 * | 5/2006 | Blagg et al. | .................... | 705/30 |
| 7,117,172 B1 * | 10/2006 | Black | ............................. | 705/35 |
| 7,233,929 B1 * | 6/2007 | Lingle et al. | ................. | 705/402 |
| 7,454,376 B1 * | 11/2008 | Argenbright | ................ | 705/36 R |
| 7,603,435 B2 * | 10/2009 | Welingkar et al. | ........... | 709/217 |
| 7,689,497 B2 * | 3/2010 | May | ................................ | 705/37 |
| 7,941,367 B2 * | 5/2011 | Bishop et al. | .................. | 705/38 |
| 7,945,512 B2 * | 5/2011 | Scipioni et al. | ................ | 705/39 |
| 7,962,406 B2 * | 6/2011 | Bishop et al. | .................. | 705/39 |
| 7,996,307 B2 * | 8/2011 | Bishop et al. | .................. | 705/39 |
| 8,103,584 B2 * | 1/2012 | Bishop et al. | .................. | 705/39 |
| 8,117,100 B1 * | 2/2012 | Hopkins | ........................ | 705/34 |
| 8,121,941 B2 * | 2/2012 | Matthews et al. | ............. | 705/39 |

(Continued)

FOREIGN PATENT DOCUMENTS

| EP | 1 193 986 | 4/2002 |
|---|---|---|
| EP | 1 369 794 | 12/2003 |

(Continued)

OTHER PUBLICATIONS

Panurach, "Money in Electronic Commerce: Digital Cash, Electronic Fund Transfer, and Ecash", Communications of the ACM, Jun. 1996/vol. 39, No. 6. (Year: 1996).*

(Continued)

*Primary Examiner* — Frantzy Poinvil
(74) *Attorney, Agent, or Firm* — Artegis Law Group, LLP

(57) ABSTRACT

A computer-implemented method for modifying control parameters associated with a financial product that is linked to an account. The method includes receiving updated control parameters for the financial product, where the account provides financial backing for the financial product, and the updated control parameters define updated use restrictions for the financial product; and modifying the control parameters associated with the financial product to reflect the updated control parameters, where the financial product is configured to be used for one or more payment transactions in accordance with the updated use restrictions.

34 Claims, 14 Drawing Sheets

(56) References Cited

U.S. PATENT DOCUMENTS

| | | | |
|---|---|---|---|
| 8,352,307 B2 * | 1/2013 | Moukas | G06Q 10/0631 |
| | | | 705/7.29 |
| 8,452,267 B2 * | 5/2013 | Friman | 455/414.1 |
| 8,468,093 B2 * | 6/2013 | Bauchot | G06Q 20/12 |
| | | | 705/35 |
| 8,751,317 B2 * | 6/2014 | Qawami et al. | 705/21 |
| 2001/0017655 A1 | 8/2001 | Arakt | |
| 2002/0169720 A1 | 11/2002 | Wilson et al. | |
| 2004/0249753 A1 | 12/2004 | Blinn et al. | |
| 2016/0182739 A1 * | 6/2016 | Guest | G06Q 20/10 |
| | | | 705/39 |

FOREIGN PATENT DOCUMENTS

| | | |
|---|---|---|
| EP | 1962238 | 8/2008 |
| JP | 2005018143 | 1/2005 |
| WO | 2009137716 | 11/2009 |

OTHER PUBLICATIONS

Rustamov, "Payments papers, Directions in the development of the payment service market", Central Bank of the Republic of Azerbaihan, Payment Systems and Settlements Department, AZ1014, 32, R. Behbudov str., Baku, Azerbajan. (Year: 2016).*

EP Search Report, EP Appl. No. 11 15 1775, dated Jun. 2011.

EP Examination Report for Application No. 11 151 775.1-1238 dated Aug. 20, 2012.

* cited by examiner

SYSTEMS AND METHODS FOR ENHANCED TRANSACTION PROCESSING

CROSS-REFERENCE TO RELATED APPLICATIONS

This application claims priority benefit to United States provisional patent application titled, "SYSTEMS AND METHODS FOR ENHANCED TRANSACTION PROCESSING" filed on Jan. 22, 2010 and having Ser. No. 61/297,642, which is hereby incorporated by reference herein.

BACKGROUND

Field of the Invention

The present invention relates generally to the field of payment processing and, more particularly, to systems and methods for enhanced transaction processing.

Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

A credit/debit card system is one where an issuer, usually a financial institution, issues a credit/debit card to a customer. The customer may then pay for goods or services using the credit/debit card. Essentially, the issuer is lending money to the customer to pay for the good or services.

When payment for goods or services is initiated with a credit/debit card, the transaction details are sent to a card network for processing. Each credit/debit card has a unique prefix that allows for proper routing of the transaction to the proper card network and to the proper financial institution. When the transaction is received by the financial institution, the transaction is processed and either approved or denied by the financial institution based on well-defined criteria.

However, existing payment products, including credit/debit cards, are premised on legacy systems that are difficult to change. For example, many financial institution systems use older generation software and mainframe computers. The rigidity of this legacy infrastructure, along with the large amount of information technology resources spent on compliance and maintenance, do not allow financial institutions to keep pace with payment technology advancements and customer demands.

Accordingly, there exists a need in the art for a payment processing platform that allows financial institutions to offer more sophisticated payment processing approaches with minimal changes to their legacy systems.

SUMMARY

One embodiment of the invention provides a computer-implemented method for modifying control parameters associated with a financial product that is linked to an account. The method includes receiving updated control parameters for the financial product, wherein the account provides financial backing for the financial product, and the updated control parameters define updated use restrictions for the financial product; and modifying the control parameters associated with the financial product to reflect the updated control parameters, wherein the financial product is configured to be used for one or more payment transactions in accordance with the updated use restrictions.

Another embodiment of the invention provides a computer-implemented method for adding control parameters to an account. The method includes receiving a selection of the account, wherein the account is held with a financial institution; receiving a selection of control parameters, wherein the control parameters define use restrictions for the account; and associating the control parameters with the account, wherein the account is configured to be used for one or more payment transactions within the use restrictions defined by the control parameters.

Yet another embodiment of the invention provides a computer-implemented method for generating a financial product that is linked to an account. The method includes performing a security screening of a recipient of the financial product, wherein the account provides financial backing for the financial product; and generating the financial product, wherein the financial product is configured to be used for one or more payment transactions.

One advantage of the disclosed techniques is that customers are provided with more security since control parameters can be applied to products and to accounts. Another advantage is that customers can modify the control parameters of the product or the account via one or more different convenient options. For example, full account management controls are available via the Internet, SMS (Short Message service), e-mail, and/or telephone. Yet another advantage is that more security is provided to the financial institution by performing an additional security check or screening of the product recipient to help avoid malicious use such as money laundering.

BRIEF DESCRIPTION OF THE DRAWINGS

So that the manner in which the above recited features of the present invention are attained and can be understood in detail, a more particular description of the present invention, briefly summarized above, may be had by reference to the embodiments thereof which are illustrated in the appended drawings. It is to be noted, however, that the appended drawings illustrate only typical embodiments of the present invention and are therefore not to be considered limiting of its scope, for the present invention may admit to other equally effective embodiments.

DETAILED DESCRIPTION

Figure 1:
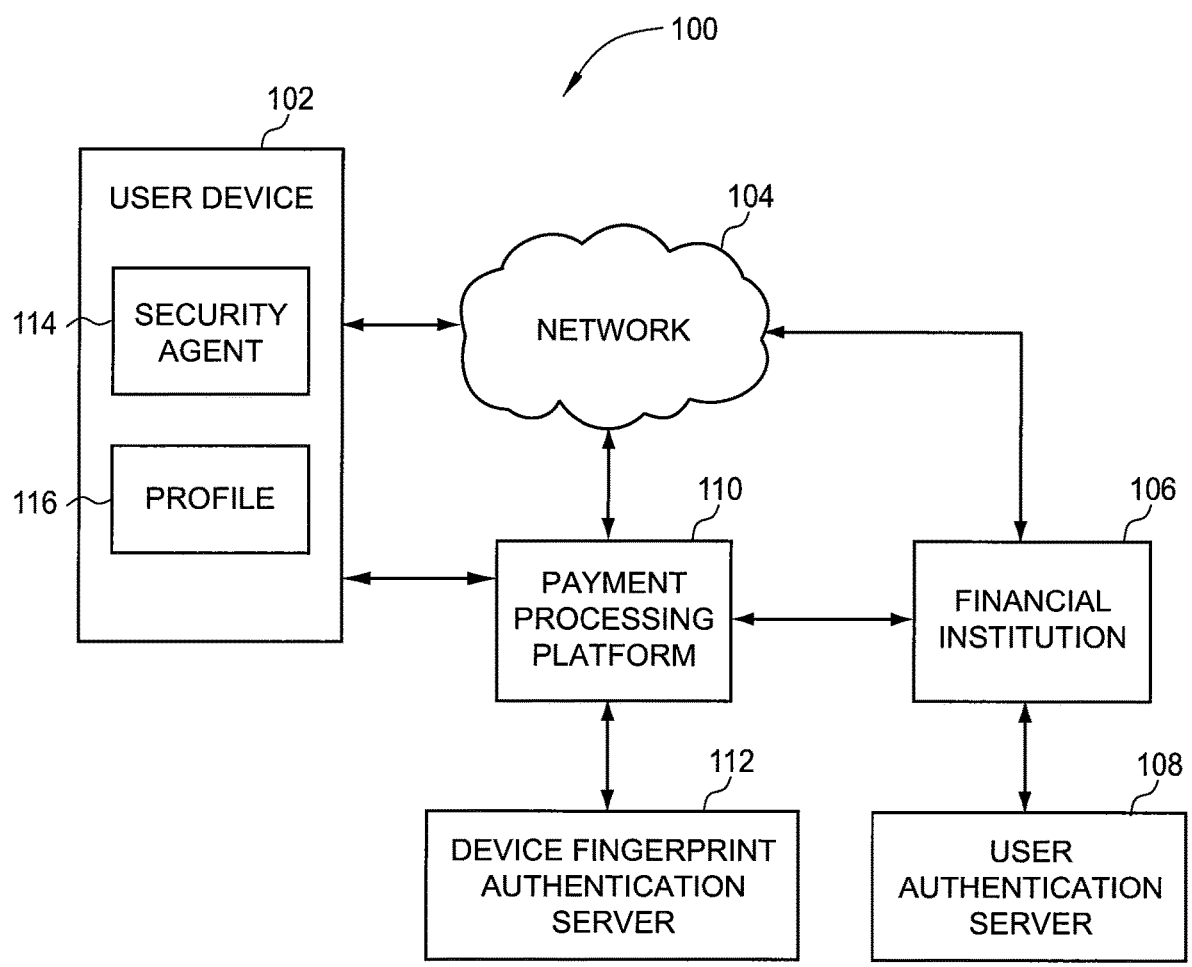
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a user device 102, a network 104, a financial institution 106, a user authentication server 108, a payment processing platform 110, and a device finger print authentication server 112.

The user device 102 may be any type of individual computing device such as, for example, a desktop computer, a laptop computer, a hand-held mobile device, a personal digital assistant, or the like. Alternatively, the user device 102 may be any other device, such as a standard telephone, or an ATM terminal for a financial institution, or a terminal used by a customer representative at a financial institution, or the like. In one embodiment, the user device 102 is configured to be in communication with the other components in the system 100 via the network 104. The network 104 may be any type of data network, such as a local area network (LAN), a wide area network (WAN), cellular communications network, the Internet, a voice network such as a standard telephone network, or combinations thereof.

As is described in greater detail below, in some embodiments of the invention, a user may generate a "child product" that is linked to a "core account" held with a financial institution. A "child product" can also be referred to as a "child card," a "financial product," or "a child financial product." In various embodiments, the core account may be any standard account held with a financial institution 106, including a checking account, a savings account, a home equity line of credit, a money market account, a credit card account, a debit card account, a prepaid card account, a gift card account, a healthcare savings account, an educational savings account, an employee benefits account, a promotion fund account, rewards account (e.g., mileage or rewards points) or the like. In other embodiments, the core account may be associated with any type of billed account, including a utility bill account, cable account, satellite television account, phone service account, cell phone account, or the like. The child product may be used to make payment transactions and the payment transactions may be processed as if the payment transactions were made using the core account. For example, a child product that is linked to a credit card core account is processed by the financial institution legacy system in a similar manner as a regular credit card transaction. Additionally, the child product may be used to deliver promotional coupons and/or to pay a salary of employees. In other use examples, the child product may be used to make an accounts payable transaction. In further embodiments, control parameters may be added to the child product, restricting the usage of the child product, as described in greater detail below.

In one embodiment, when a user wishes to generate the child product, the user may direct the user device 102 to navigate to a webpage of the financial institution 106. In another embodiment, the user may use an ATM terminal at the financial institution to generate the child product. In yet another embodiment, the user may request the generation of a child product through a customer service representative at a branch location of the financial institution 106. In yet another embodiment, the user may request the generation of a child product through a customer service representative at a customer support call center of the financial institution 106. In still further embodiments, the user may request the generation of the child product directly from the payment processing platform 110. In still further embodiments, the user may request generation of the child product via SMS or by phone via IVR (interactive voice recognition).

As described in greater detail below, the user may need to authenticate with the financial institution 106 before the child product is generated. In one embodiment, authentication includes the user being prompted to enter a username and/or password. In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. In alternative embodiments, a third-party other than a financial institution, may offer the ability to generate child products. In these embodiments, the user may be authenticated using any of the authentication methods described in relation to authenticating with a financial institution, as described below in conjunction with FIGS. 8B-8E.

In another embodiment, to provide an additional layer of security, the user device 102 may include a security agent 114 and device profile 116. After the user has been authenticated with the financial institution 106, the payment processing platform 110 may prompt the security agent 114 installed on the user device 102 for the device profile 116 of the user device 102. The security agent 114 transmits the device profile 116 to the payment processing platform 110. The received device profile 116 is compared to data stored in the device finger print authentication server 112 that may include a listing of approved/authenticated user devices associated with each user. In one embodiment, each time that a user attempts to authenticate with a different user device 102, a confirmation code is sent to an e-mail address for the user that the user enters before the user device is authenticated. In alternative embodiments, the confirmation code may be sent to the user via a SMS, a text message, or via any other electronic means including by telephone. Once a particular user device 102 has been confirmed, the device profile 116 of the user device 102 is stored in the database of the device finger print authentication server 112. The next time the user attempts to authenticate using that particular user device 102, the device profile 116 of the user device is recognized by the device finger print authentication server 112 and the user is authenticated. Once the user is properly authenticated, the user may generate the child product.

In still further embodiments, control parameters are applied to the core account held with the financial institution. Accordingly, the control parameters applied to the core account can be modified by the user or by a financial institution, as described in greater detail herein.

Figure 2:
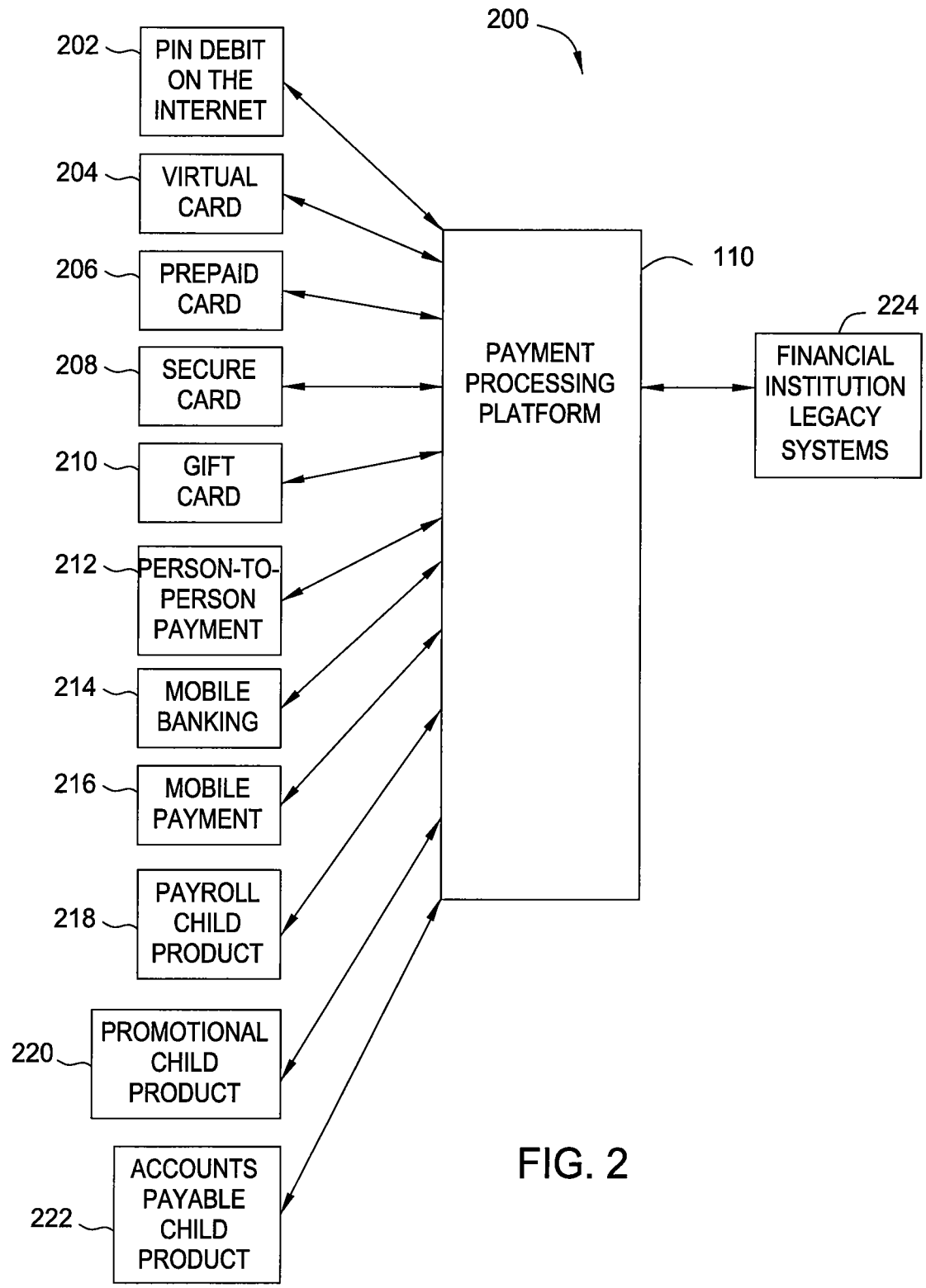
FIG. 2 is a conceptual illustration of a system including a payment processing platform, according to one embodiment of the invention.

FIG. 2 is a conceptual illustration of a system 200 including a payment processing platform 110, according to one embodiment of the invention. As shown, the payment processing platform 110 serves as a processor between various child products 202-222 and financial institution legacy systems 224. However, in other embodiments, the payment processing platform 110 may reside between any number of financial systems. In yet another embodiment, the payment processing platform 110 is integrated with the financial institution 106. Child products may include a PIN debit child product 202, a virtual card child product 204, a prepaid card child product 206, a secure card child product 208, a gift card child product 210, a person-to-person payment child product 212, a mobile banking child product 214, a mobile payment child product 216, a payroll child product 218, a promotional child product 220, or an accounts payable child product 222. One or more child products 202-222 are delivered to a recipient that may use the child products 202-222 to make a payment. In one embodiment, the recipient is the same individual as the user that generated the child product. In alternative embodiments, the recipient is different from the user that generated the child product.

As is known, in a debit transaction, a debit card or bank card is used to make a payment. The use of a debit card is functionally similar to writing a check, as the funds are withdrawn directly from the financial institution account of a customer. In a conventional PIN-debit card transaction at a physical merchant location, the customer may swipe or insert the debit card into a terminal and the transaction is authenticated by entering a personal identification number (PIN). However, PIN-debit transactions are not initiated on the Internet because customers are wary of entering their PIN number into a browser webpage for security reasons.

The PIN debit child product 202 allows for PIN debit transactions on the Internet. From a payment page of an online merchant, a user/customer may select a "Pay From My Financial Institution" payment option. At this point, the user/customer is authenticated through the financial institution's authentication server 108, as described above in FIG. 1. A virtual debit card number and a virtual PIN may be generated that are linked to the account of the user/customer held at the financial institution. The user/customer is able to initiate the online transaction as if the transaction was being made using a normal debit card. In this way, because the user/customer has already been authenticated with the financial institution through the financial institution's authentication server 108, the virtual PIN serves the same purpose as a real PIN from the merchant's perspective. In this way, the core account transaction is processed as a PIN debit transaction at the financial institution. In another embodiment, the payment processing platform receives a trigger from a merchant. In response, the payment processing platform transmits a listing of financial institutions offering the ability to generate child products to the merchant. A user/customer selects a financial institution from the listing and the user is authenticated through the financial institution's authentication server 108, as described above in FIG. 1.

A virtual card child product 204 is a payment method for which non physical manifestation of child card is generated. A user may create a virtual card child product 204 as a virtual credit or debit card, having a seemingly "normal" credit/debit card number, which can be used by the customer for card-not-present transactions such as online transaction, or mail-order telephone orders (MOTO) transactions. In alternative embodiments, a virtual card child product 204 may be generated and the card number may be associated with the contactless payment options enabled by a mobile device such as a radio-frequency identification (RFID) tag of a mobile device to allow a customer to make contactless payments at a point-of-sale location. In further embodiments, a virtual card child product 204 may be generated and the customer may print out an image of the virtual card child product, optionally including other identifying information such as a bar code, and take the print-out to a merchant location as a form of payment.

The prepaid card child product 206 may be generated with a preloaded balance. A user may load the prepaid card child product 206 with a limit that cannot be exceeded. Additional control parameters may include a per-transaction limit, or impose further restrictions, as described below. The prepaid card child product 206 may be a physical card, a virtual card, or both a physical card and a virtual card.

A secure card child product 208 is a payment method where child product is generated that is linked to a core account. In one embodiment, transaction made using the secure card child product 208 may be processed similar to transactions made using the core account. Additional control parameters may limit a per-transaction limit, or impose further restrictions, as described below. The secure card child product 208 may be a physical card, a virtual card, or both a physical card and a virtual card.

The gift card child product 210 is a payment method that may be given to another as a gift. The gift card child product 210 may be a physical card, a virtual card, or both a physical card and a virtual card. A gift card child product 210 is different from a prepaid card child product 206 since no funds are withdrawn/charged to the core account when a gift card child product 210 is generated. A gift card child product 210 may still include a limit; however, funds are only withdrawn/charged to the core account when transactions are initiated with the gift card child product 210. In other words, a portion of credit available in the core account is allocated for use by a recipient of the gift card child product 210. This differs from the prepaid card child product 206 which is generated with a pre-loaded balance.

The person-to-person payment child product 212 may be generated and used as a form of payment from one person/entity to another as a form of payment. In one embodiment, the person-to-person payment child product 212, like other child products, may be used to pay for goods or services in merchant transactions. In alternative embodiments, the person-to-person payment child product 212 may be converted to cash. The conversion may be a dollar-for-dollar conversion based on the card limits of the person-to-person payment child product 212, or may be some other ratio.

Mobile banking child products 214 and mobile payment child products 216 may be generated using a mobile device. Similarly, transactions made using other child products may be made with a mobile device.

The payroll child product 218 may be generated by an employer and distributed to employees as a form of salary payment. Each payroll child product 218 may be linked to the same core account (such as the employer's bank account) and may be distributed as a physical card and/or a virtual card. The payroll child product 218 may be generated having few, if any, control parameters that restrict the use of the payroll child product 218. The payroll child product 218 is a convenient mechanism for employers to distribute salaries and bonuses, and the payroll child product 218 provides flexibility to employees who do not have a checking or savings account at a commercial bank. Once distributed, the payroll child product 218 may be used to initiate one or more child transactions at various merchant locations, including payment transactions and/or redemption transactions. Redemption transactions are transactions that convert the payroll child product 218 into cash or initiate a deposit of an equivalent amount of funds into an account held by the recipient 802 at a financial institution. Redemption of the payroll child product 218 may occur through an ATM terminal, a commercial bank branch location, a check-cashing location, or any other mechanism. The payroll child products 218 may include few, if any, control parameters other than value of the child product to provide recipients 802 with maximum flexibility in how they use the funds linked to the payroll child product 218.

The promotional child product 220 may be generated by a merchant or franchisor and distributed to customers as a form of "coupon" or promotional discount. Promotional child products 220 can be mass-distributed to multiple customers, where each promotional child product 220 is linked to the same core account. Each promotional child product 220 may include the same values for the control parameters, such as expiration date, coupon value, and geographic region where the promotional child product 220 may be redeemed. In alternative embodiments, the control parameters (e.g., the value of the promotional child product 220) may vary for different customers based on certain criteria. For example, a franchisor may generate promotional child products 220 providing a $5.00 discount on purchases for customers in California, but the franchisor may generate promotional child product 220 providing a $3.00 discount on purchases for customers in Arizona for the same promotion. The promotional child product 220 may be delivered to the customers by the payment processing platform 110 via text message, e-mail, physical card, virtual card, and/or any other technically feasible medium.

The accounts payable child product 222 may be generated by a payor business and transmitted to a payee business as a form of payment. For example, a payor company may receive a bill for $10,000.00 for services rendered by a payee company. The payor company may then generate an accounts payable child product 222 with control parameters limiting the accounts payable child product 222 to one or more transactions with a maximum transaction amount of $10,000.00. The accounts payable child product 222 is then delivered to the payee business, whereupon the payee business redeems the accounts payable child product 222. Upon redemption, $10,000.00 is transferred from a financial institution of the payor company to a financial institution of the payee company. In some embodiments, additional control parameters can be added to the accounts payable child, such as an expiration date or a particular geographical region that limits the boundaries of redemption. This allows for enhanced security and efficiency of the transaction between the payor and the payee.

As described in greater detail below, any of the "child products" 202-222 described above may be applicable in the context of the core account. For example, control parameters may be added to a core account by executing the method steps 802-810 described in FIG. 8A.

Figure 3A:
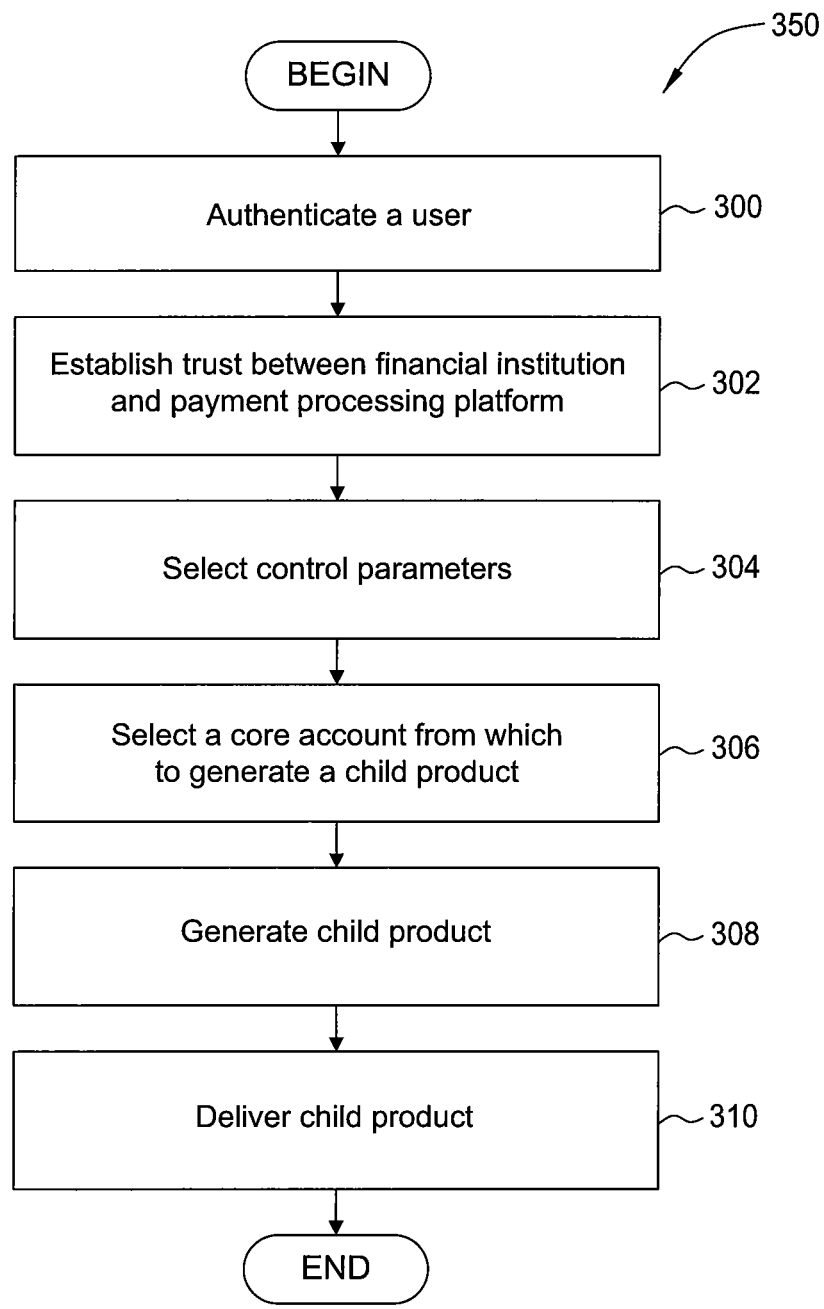
FIG. 3A is a flow diagram of method steps for generating a child product, according to one embodiment of the invention.

FIG. 3A is a flow diagram of method steps for generating a child product, according to one embodiment of the invention. Persons skilled in the art will understand that, even though the method 350 is described in conjunction with the systems of FIGS. 1 and 2, any system configured to perform the steps of the method 350 illustrated in FIG. 3A, in any order, is within the scope of the present invention.

As shown, the method 350 begins at step 300, where a user is authenticated. In one embodiment, the user may be authenticated by entering a username and password into a log-on screen of a financial institution website. In alternative embodiments, a third-party other than a financial institution may offer the ability to generate child products. In these embodiments, the user may be authenticated by entering a username and password into a log-on screen of the third-party website. In yet further embodiments, the device with which the user is attempting to authenticate himself is verified by comparing a device profile for the user device against a database of user devices previously registered by the user, as described in reference to FIG. 1. In one embodiment, the user is authenticated by a payment processing platform, as described herein. In other embodiments, the user is authenticated by another entity, other than the payment processing platform.

In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. For example, the user may be asked to verify a social security number and/or mother's maiden name. In yet other embodiments, the user may be authenticated using biometric characteristics. In still further embodiments, a user may be authenticated by the phone number used in sending an SMS or a voice call via the service provider, with or without a PIN number being provided.

Once the user is properly authenticated, the method 350 proceeds to step 302, where a trust is established between the financial institution 106 and the payment processing platform 110. In another embodiment, at step 302, a trust is established between a third party, other than a financial institution, that may be responsible for authentication and the payment processing platform110. One embodiment of step 302 is described in greater detail in FIG. 3B.

Figure 3B:
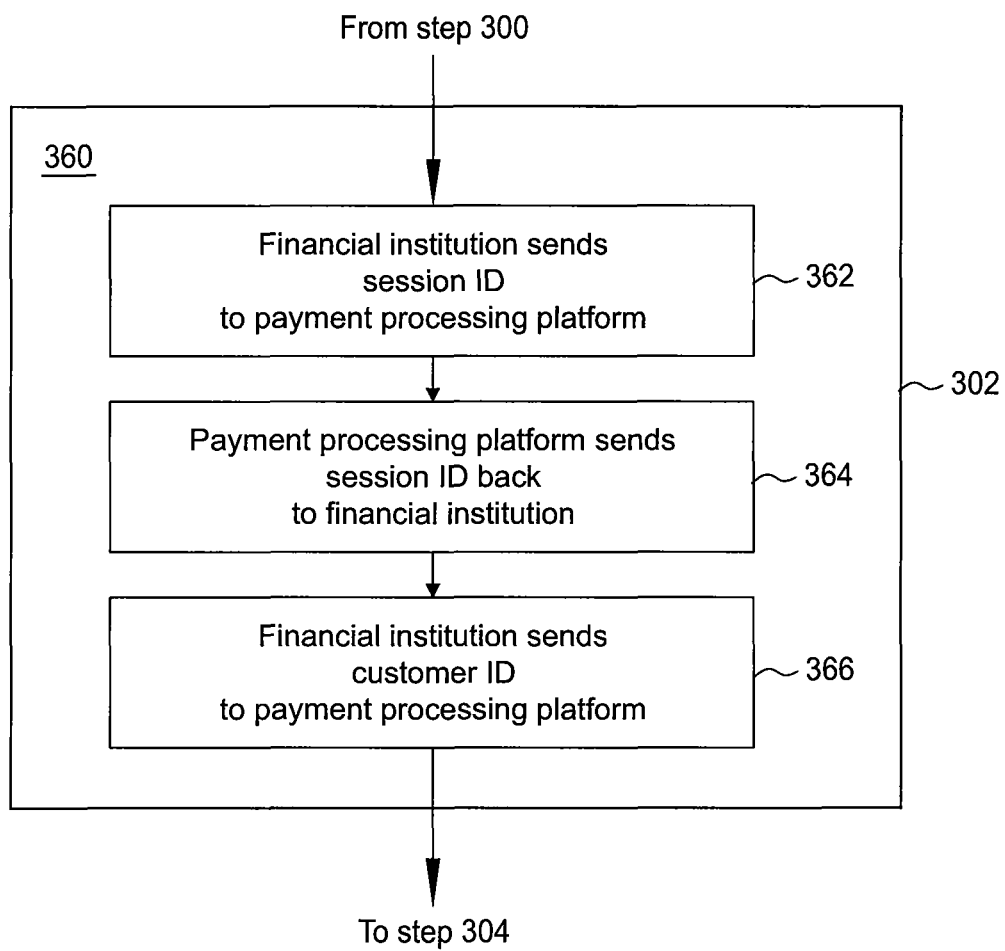
FIG. 3B is flow diagram of method steps for establishing trust between a financial institution and a payment processing platform, according to one embodiment of the invention.

FIG. 3B is flow diagram of method steps for establishing trust between a financial institution 106 and a payment processing platform 110, according to one embodiment of the invention. Persons skilled in the art will understand that, even though the method 360 is described in conjunction with the systems of FIGS. 1 and 2, any system configured to perform the steps of the method 360 illustrated in FIG. 3B, in any order, is within the scope of the present invention.

As shown, the method 360 begins at step 362, where the financial institution 106 sends a session identifier (session ID) to the payment processing platform 110 to begin the trust establishment process. Next, at step 364, the payment processing platform 110 sends the session ID back to the financial institution 106 through a back door to verify that the financial institution 106 had indeed sent that session ID, rather than a hacker, for instance. It should be noted that the exchange of the session ID is not the only means of establishing trust between the systems 106, 110; rather, trust may be established by any means known in the art without departing from the principles of the present invention. Then, at step 366, the financial institution 106 sends a customer identifier (customer ID) to the payment processing platform 110. In one embodiment, within the servers of the payment processing platform 110, the customer ID may be used to translate from a child product card number to a "real" account number, as described in greater detail below.

Referring back to FIG. 3A, at step 304, control parameters are selected. In one embodiment, control parameters include a series of restrictions on transactions made with the child product. For example, the control parameters may include, but are not limited to, a card spending limit, a per-transaction spending limit, a daily spending limit, a weekly spending limit, a limit on number of transactions in a given period of time, a name on card, an activation date, an expiration date, a country of use, a merchant of use, a merchant category, a time of day, a day of week, a date of month, a merchant channel (online, point-of-sale) of usage, a reset frequency for reset-able cards, a geographical region for valid redemption, and the like.

When a child product is attempted to be used in a transaction, the transaction details may be checked against the control parameters stored for the child product. In one embodiment, if at least one of the control parameters is not satisfied, then the transaction is rejected. If each of the control parameters match those stored for the child product, the transaction proceeds to processing, as described in greater detail below in FIGS. 6 and 7. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per-transaction limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product to determine a match may be available.

Figure 4:
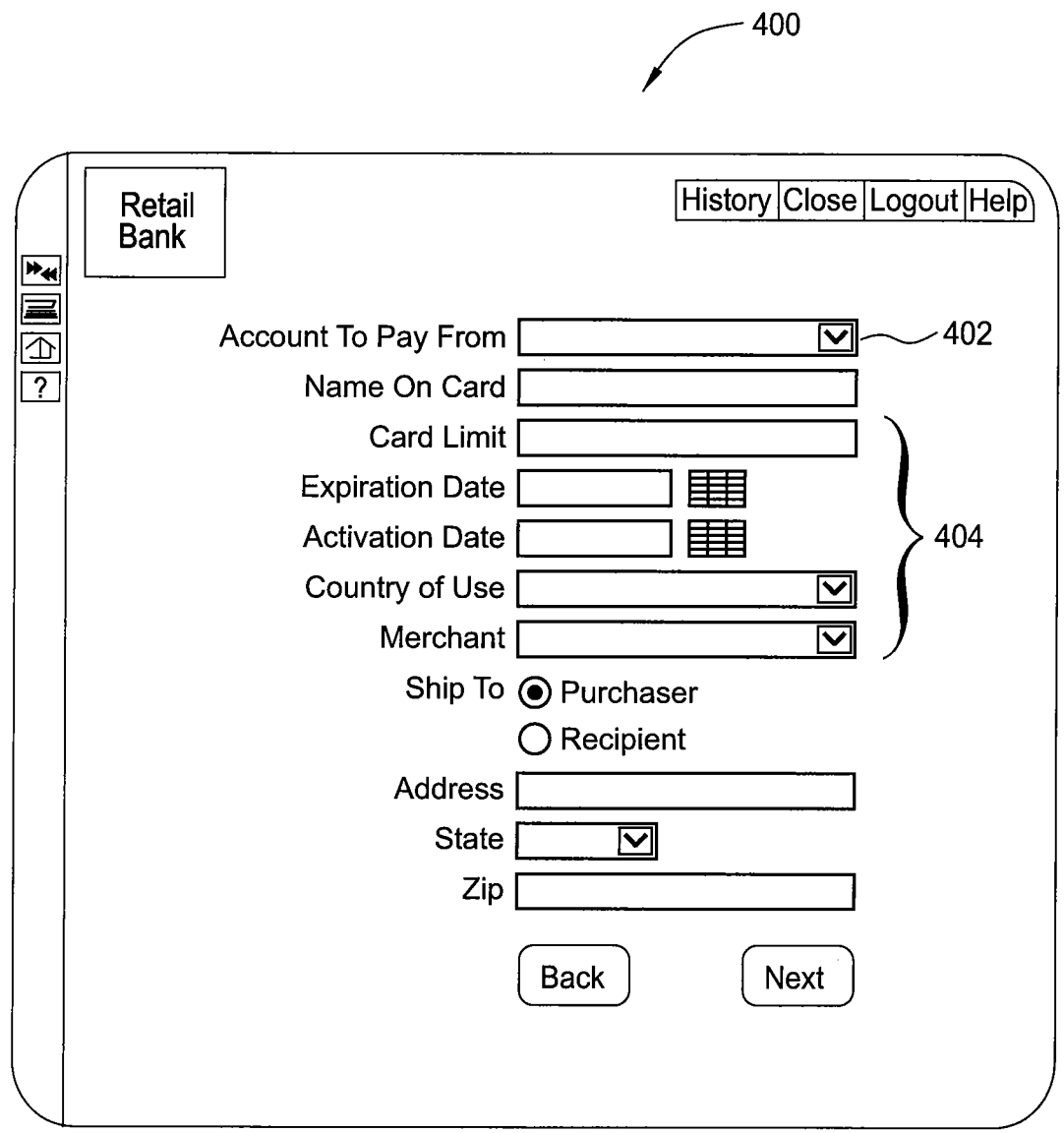
FIG. 4 is a screen shot illustrating selection of control parameters for a child product, according to one embodiment of the invention.

FIG. 4 is a screen shot 400 illustrating selection of control parameters 404 for a child product, according to one embodiment of the invention. In one embodiment, the selection of the core account 402 may be included in a single screen with the selection of the control parameters 404. As shown, the control parameters include card limit, expiration date, activation date, country of use, and merchant of use. As one having ordinary skill in the art will appreciate, additional control parameters may be selected for the child product, including merchant category (e.g., "restaurants"). For convenience, each child card may be given a name to remind a user of the purpose of a child card.

Referring back to FIG. 3A, at step 306, a core account is selected from which to generate a child product. In one embodiment, the core account may be any type of financial account held with a financial institution. For example, the core account may be a checking, savings, home equity, credit card account, rewards account or the like. When a child product is generated from a core account, any transactions made using the child product are processed as though the transaction was made using the core account, as is described in greater detail below.

At step 308, a child product is generated. In one embodiment, the child product is generated having a 16-digit card number, a card identification value, an expiration date, and a name on card. As is known, a card number includes a Bank Identification Number or BIN number. The BIN number is generally a one- to six-digit number that identifies the financial institution that issued the credit/debit card. In one embodiment of the invention, the child product generated at step 308 includes a BIN number that identifies that the child product as being issued by the payment processing platform 110. In alternative embodiments, the generated child card may include a BIN number within a range that identifies that the child product is associated with a particular financial institution, but is nevertheless a child product. In still further embodiments, depending on the category of the selected core account, the financial institution may request that the payment processing platform issue a child product of a particular type. For example, if the user selects a credit card account as the core account, then the generated child product may include a BIN number that identifies that child card as being a credit card that is processed through a particular credit card network.

Figure 5:
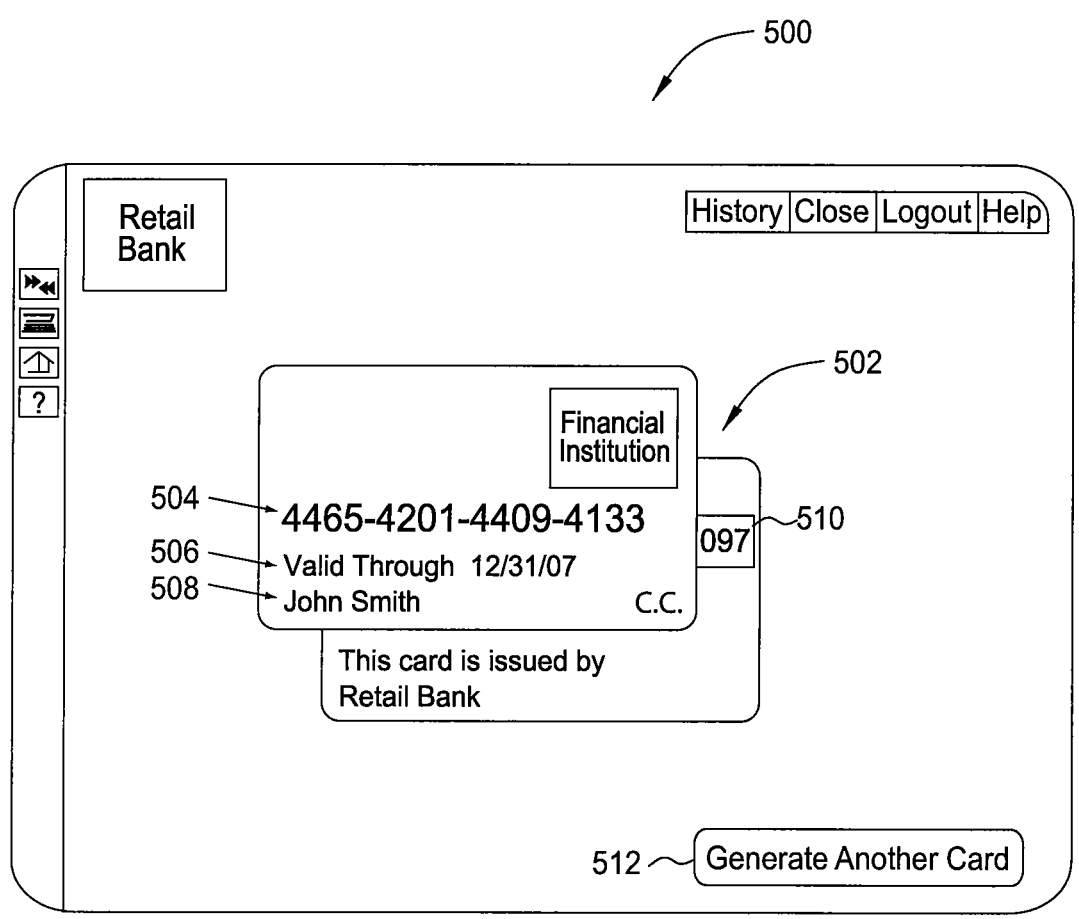
FIG. 5 is a screen shot illustrating a generated child product, according to one embodiment of the invention.

FIG. 5 is a screen shot 500 illustrating a generated child product 502, according to one embodiment of the invention. As shown, the child product 502 includes a card number 504, expiration date 506, name 508, and card identification value 510. As described above, a physical card may be requested and mailed to the address input when generating the child product 502. Alternatively, the child product 502 may be delivered electronically as a virtual card, or the child product 502 may be delivered both physically and electronically. The child product 502 can be used at a physical merchant or at a card-not-present merchant, such as online merchants, or mail-order telephone orders (MOTO) merchants, or any other place where a card is accepted as a payment instrument. In one embodiment, a virtual card may be generated and the card number may be associated with the contactless mobile payment solution such as a radio-frequency identification (RFID) tag of a mobile device to allow a user to make contactless payments at a point-of-sale location. In further embodiments, a virtual card may be generated and the user may print out an image of the virtual card child product, optionally including other identifying information such as a bar code, and take the print-out to a merchant location as a form of payment. In one embodiment, the card identification value is a Card Verification Value, like CVV, CVV2, PIN number, or any other card identification value.

Referring back to FIG. 3A, at step 310 the child product is delivered to the customer. In one embodiment, the child product may be a physical card that is mailed to the customer or to the recipient. In alternative embodiments, the child product may be a virtual card that is available to the customer/recipient through a web browser. Alternatively, the child product may be a virtual card that is e-mailed to the customer/recipient, sent using a SMS, sent using any electronics medium, or delivered over the phone. A virtual card is a payment method for which a non physical manifestation of child card is generated. In some embodiments, a physical manifestation is also generated in addition to the non-physical virtual card. A user may create a virtual card as a virtual credit or debit card, having a seemingly "normal" credit/debit card number, which can be used by the customer for card-not-present transactions such as online transaction, or mail-order telephone orders (MOTO) transactions. In alternative embodiments, a virtual card may be generated and the card number may be associated with the contactless payment options enabled by a mobile device such as a radio-frequency identification (RFID) tag of a mobile device to allow a customer to make contactless payments at a point-of-sale location. In further embodiments, a virtual card may be generated and the customer may print out an image of the virtual card child product, optionally including other identifying information such as a bar code, and take the print-out to a merchant location as a form of payment.

Figure 6:
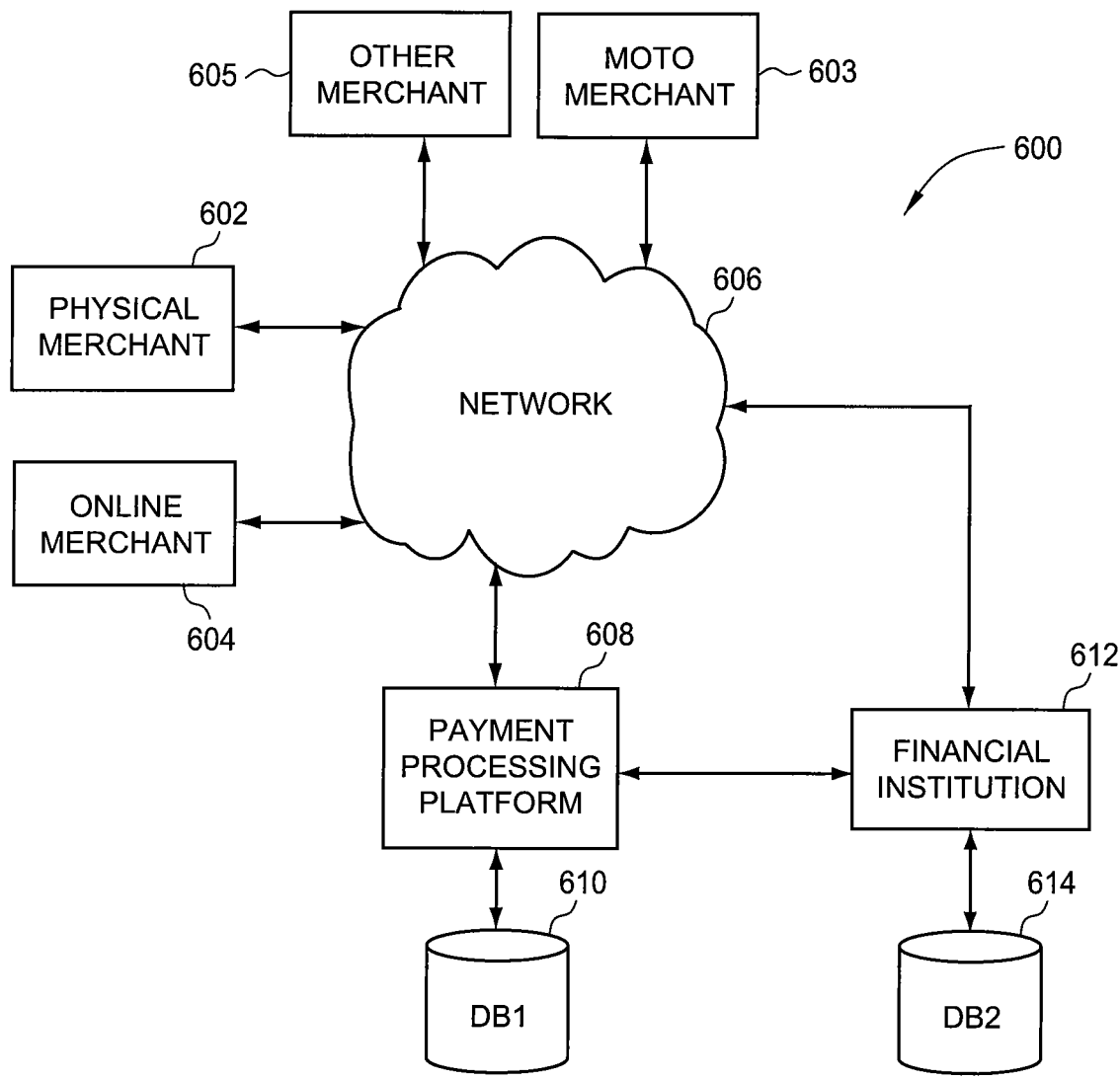
FIG. 6 is a block diagram illustrating components of a system configured to process a child transaction and a core account transaction, according to embodiments of the invention.

FIG. 6 is a block diagram illustrating components of a system 600 configured to process a child transaction and a core account transaction, according to embodiments of the invention. As shown, the system 600 includes the physical merchant 602, mail-order telephone orders (MOTO) merchant 603, online merchant 604, other merchant 605, a network 606, a payment processing platform 608, a first database 610, a financial institution 612, and a second database 614.

In one embodiment, a transaction initiated with a child product is known as a "child transaction." In some embodiments, the child product comprises a financial product that is linked to a core account. In one embodiment, a core account having associated control parameters is processed similarly to a child transaction, except that no mapping is performed that maps the child product to a core account. As described above, a child product may be delivered in the form of a physical card mailed to a customer or to a recipient. Alternatively, the child product may be delivered electronically as a virtual card. Alternatively, the child product may be delivered both physically as a physical card and electronically as a virtual card. Both the physical card child product and the virtual child card product may be used at any physical merchant 602, MOTO merchant 603, online merchant 604, or other merchant 605 that accepts regular credit/debit cards.

A child transaction may be initiated at the physical merchant 602. For example, a cashier at the physical merchant 602 may swipe the physical child product through a card reader. Alternatively, a child product may be delivered virtually on a user's mobile device and a user at the physical merchant 602 may wave his/her mobile device in front of a contact-less card reader. In still further embodiments, the customer may show his/her mobile device to a cashier at the merchant location who manually enters the card number of the child product.

In one embodiment, the network 606 is a card network. In alternative embodiments, the network 606 is an electronic funds transfer (EFT) network or a private network. For example, the child product may be a credit card child product, in which case child transaction information is sent to the appropriate credit card network. Similarly, the child product may be a signature debit card child product, in which case the child transaction information is sent to the appropriate debit card network. In other embodiments, the child product may be a PIN debit card, in which case the child transaction information is sent to the appropriate EFT network. Additionally, the child product may be a special card, in which case the child transaction information is sent to the appropriate private network.

In one embodiment, when a child transaction is received by the network 606 and identified as having a BIN number in the range associated with the payment processing platform 608, then the child transaction is routed to the payment processing platform 608. In another embodiment, when a child transaction is received by the network 606 and identified as having a special BIN number in the range associated with a financial institution of the core account, then the child transaction is routed to the payment processing platform 608.

When a child transaction is received by the payment processing platform 608, the payment processing platform 608 may then compare the child transaction details with control parameters stored for that particular child product in the first database 610. As described above, the comparison may require that each control parameter stored for the child product is satisfied, that a minimum number of control parameters are satisfied, or that a sum of the weights assigned to control parameters that are satisfied exceeds a minimum threshold. In one embodiment, if at least one of the control parameters is not satisfied, then the payment processing platform may return a decline response to the network 606 and the child transaction is denied. If each of the control parameters is satisfied, then the card number of the child product is linked to the "real" account number of the core account to which the child product is linked. In embodiments where the child product comprises a core account with control parameters, then "real" account number is already known and no mapping is performed.

In one embodiment, the second database 614 contains the mapping from child product card numbers to core account numbers, and may be located on the systems of the financial institution 612. In alternative embodiments, the second database 614 may reside on systems operated by the payment processing platform 608. In yet another embodiment, database 610 and 614 may be combined. Once the core account number is determined, a core account transaction is generated and is transmitted to the network 606 for normal routing and processing as a core account transaction. The core account transaction is sent to the financial institution that issued the core account. The processing system at the financial institution that issued the core account processes the core account transaction in normal fashion and approves or denies the transaction based on a normal set of processing rules. In embodiments where the child transaction is received at a merchant and transmitted from the financial institution 612 to the payment processing platform 608, the core account transaction generated by the payment processing platform 608 is transmitted to the financial institution 612, bypassing the network 606.

A similar child transaction may be initiated from an online merchant 604, from a MOTO merchant 603, or from any other merchant 605. In one embodiment, the user may input the child product card number into a payment webpage and an online child transaction is initiated. In another embodiment, the user may submit the child product card number to a customer service representative at a MOTO merchant 603. In yet another embodiment, the user may submit the child product card number in a mail order form to a MOTO merchant 603. A child transaction initiated at a MOTO merchant 603, at an online merchant 604, or at any other merchant 605 may be processed in similar fashion to a child transaction initiated at the physical merchant location 602.

Figure 7:
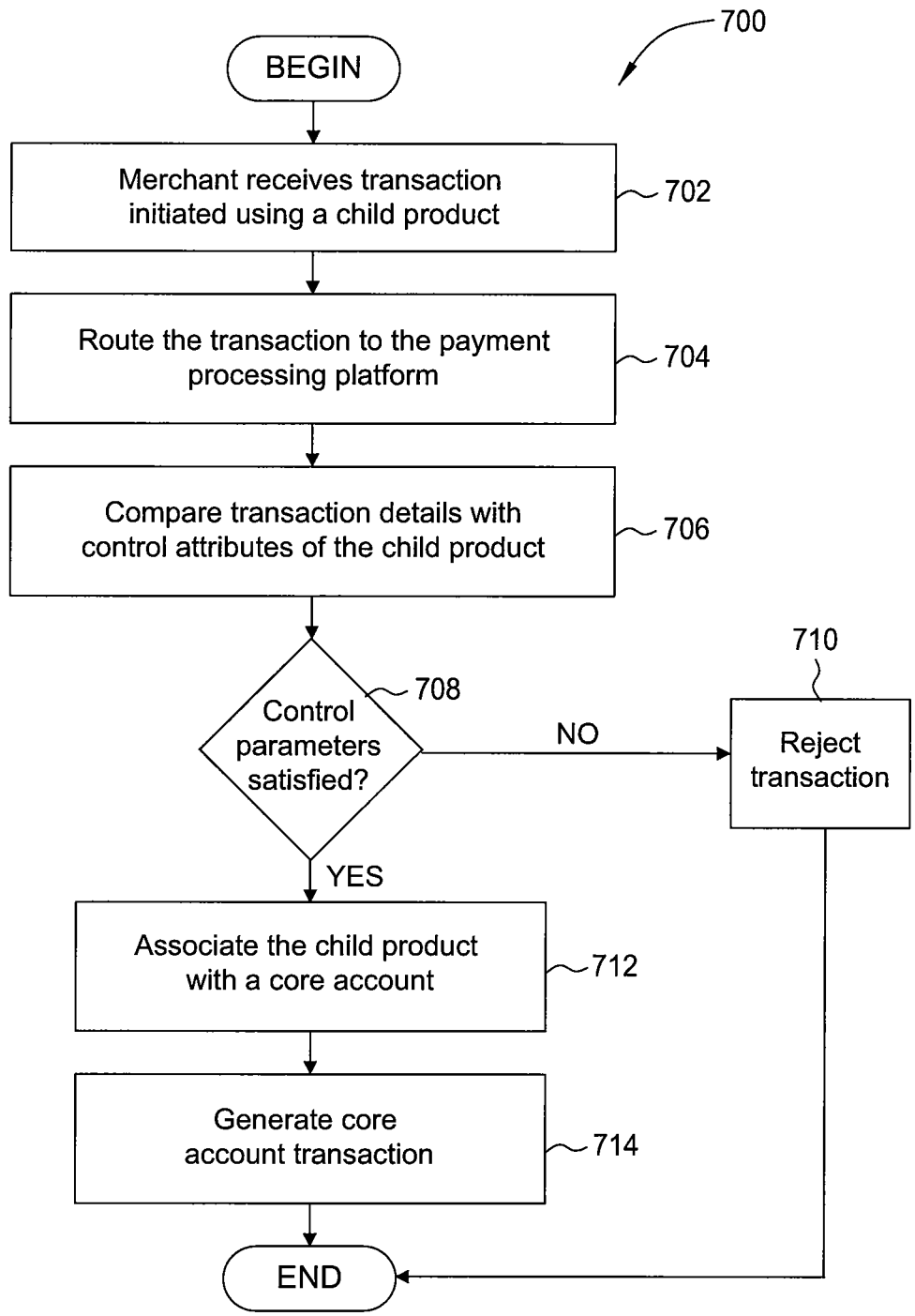
FIG. 7 is a flow diagram of method steps for processing the child transaction and the core account transaction, according to one embodiment of the invention.

FIG. 7 is a flow diagram of method steps for processing a child transaction and a core account transaction, according to one embodiment of the invention. Persons skilled in the art will understand that, even though the method 700 is described in conjunction with the systems of FIGS. 1, 2, and 6 any system configured to perform the steps of the method 700 illustrated in FIG. 7, in any order, is within the scope of the present invention.

As shown, the method 700 begins at step 702, where a merchant receives a child transaction initiated using a child product. In one embodiment, the merchant is a physical merchant and the child transaction is initiated by the child product (physical card) being swiped through a credit card reader or virtual card waved in front of a contactless card reader or virtual card read by a bar code reader, or merchant reading a card number from device or a print out. In alternative embodiments, the merchant is an online merchant, MOTO merchant, or other merchant that receives a child product card number that is input into a payment webpage of the online merchant website, over the phone, via a mail-order, or via any other means.

At step 704, the child transaction is routed to the payment processing platform. As described above, a child product includes a BIN number within a BIN number range that identifies the child product as such. In one embodiment, the child transaction is passed directly to the payment processing platform from the merchant, bypassing the network. In alternative embodiments, the child transaction is passed from the merchant to a network. In alternative embodiments the child transaction is passed from a merchant to the financial institution 612 and then passed to the payment processing platform 608. As described, the child product may be a credit card, in which case the child transaction information is sent to the appropriate credit card network. Alternatively, the child product may be a signature debit card, in which case the child transaction information is sent to the appropriate debit card network. The child product may be a PIN debit card, in which case the child transaction information is sent to the appropriate EFT network. The child product may be a special card, in which case the child transaction information is sent to the appropriate private network. In further embodiments, the child transaction is processed through multiple networks before ultimately being routed to the payment processing platform. In one embodiment, to the merchant, the child transaction may proceed as though the payment processing platform is the "issuer" of the child product with which the child transaction is initiated.

At step 706, the payment processing platform compares the child transaction details with control parameters of the child product. As described above, each child product is associated with a series of control parameters that are stored in a first database DB1, referenced by child product. When the child transaction is received by the payment processing platform, the child product card number may be used as a reference pointer to determine the associated control parameters stored in the first database DB1.

At step 708, if the control parameters of the child transaction do not satisfy the control parameters stored in the first database DB1, then the child transaction is rejected, a denial is returned at step 710, and the method 700 terminates. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant. In alternative embodiments, if the child transaction was routed from the financial institution 612, then a denial is returned to the financial institution 612.

As described above, the determination of whether the control parameters satisfy at step 708 may require that each control parameter stored for the child product is satisfied, that a minimum number of control parameters are satisfied, or that a sum of the weights assigned to control parameters that are satisfied exceeds a minimum value. If at step 708 the control parameters satisfy, then the method 700 proceeds to step 712.

At step 712, the child product is associated with a core account. However, when the child product is a core account associated with one or more control parameters, this step is not required. As described above, a second database DB2may optionally store a mapping of the child product to the core account to which the child product is linked. In one embodiment, the second database DB2resides on the financial institution system. In alternative embodiments, the second database DB2 resides within a system associated with the payment processing platform. In an alternative embodiment, the mapping is stored on DB1.

At step 714, a core account transaction is generated based on the core account number and other child transaction details. In one embodiment, the core account transaction is transmitted to the network for normal processing. For example, the financial institution that receives the core account transaction may view the core account transaction with the payment processing platform as being the "merchant" from which the transaction was initiated. In alternative embodiments, the core account transaction is transmitted directly to the financial institution from the payment processing platform, bypassing the network.

In one embodiment, when the core account transaction is received at the financial institution, the financial institution views the core account transaction as initiating from the payment processing platform as a merchant entity. Thus, the financial institution processes the core account transaction and transfers funds to the payment processing platform, which in turn transfers the funds to the original merchant. In alternative embodiments, the financial institution that receives the core account transaction can determine the original merchant is the payee, and the funds are transferred to the merchant, bypassing the payment processing platform. In this manner, a two-part transaction is completed. In one embodiment, the child transaction, as described at step 702-706, is processed as though the payment processing platform is the "issuer" of the child product. Then, the core account transaction, as described at steps 712-714, is processed by the financial institution as though the payment processing platform is the "merchant" that initiated the core account transaction.

Figure 8A:
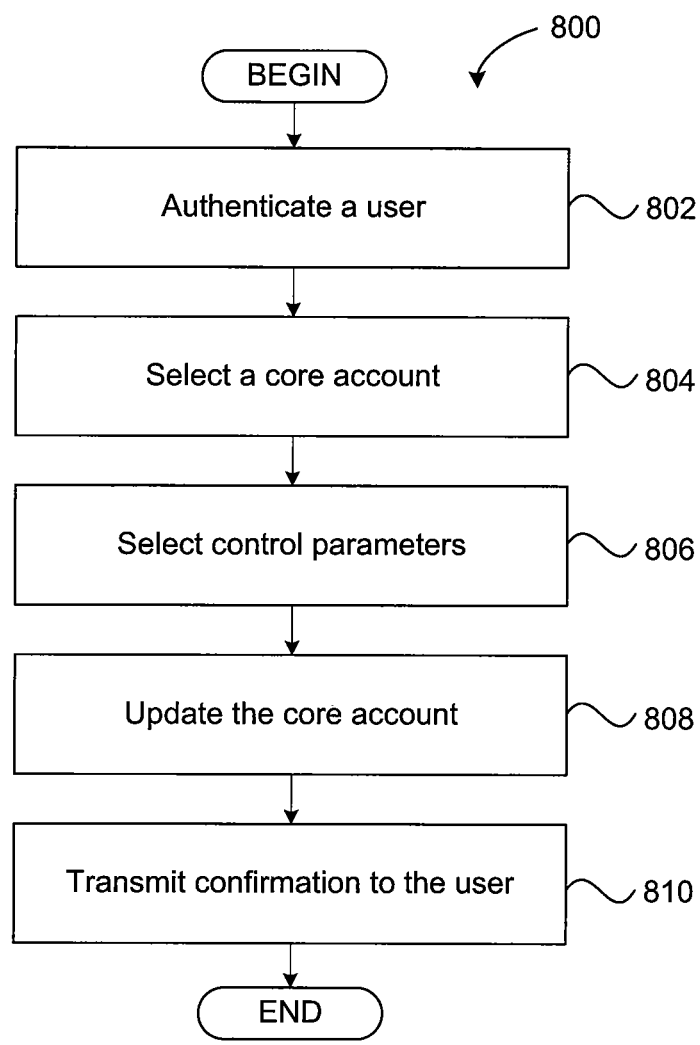
FIG. 8A is a flow diagram of method steps for setting up or modifying control parameters associated with a core account, according to one embodiment of the invention.

FIG. 8A is a flow diagram of method steps for setting up or modifying control parameters associated with a core account, according to one embodiment of the invention. Persons skilled in the art will understand that, even though the method 800 is described in conjunction with the systems of FIGS. 1-2 and 4-6, any system configured to perform the steps of the method 800 illustrated in FIG. 8A, in any order, is within the scope of the present invention.

As shown, the method 800 begins at step 802, where the payment processing platform 110 authenticates a user. In other embodiments, an entity other than the payment processing platform 110, such as the financial institution 106, authenticates the user. Step 802, in some embodiments, is substantially similar to the authentication step 300 in FIG. 3A.

At step 804, the user selects a core account to which control parameters should be applied. The core account may be any standard account held with a financial institution 106, as previously described in FIG. 1, such as a checking account or a standard credit card account or a standard debit card account. At step 806, the user selects control parameters to be applied to the selected core account. For example, the control parameters may include, but are not limited to, a card spending limit, a per-transaction spending limit, a daily spending limit, a weekly spending limit, a limit on number of transactions in a given period of time, a name on card, an activation date, an expiration date, a country of use, a merchant of use, a merchant category, a time of day, a day of week, a date of month, a merchant channel (online, point-of-sale), a reset frequency for reset-able cards, a geographical region, and the like.

At step 808, the payment processing platform 110 updates the core account to be associated with the one or more control parameters selected at step 806. The transaction details of a transaction made using the core account are routed to the payment processing platform 110 for comparison against the control parameters. If the transaction details satisfy the control parameters, then the transaction is processed in normal course. If the transaction details do not satisfy with the control parameters, then the transaction is denied.

At step 810, the payment processing platform 110 transmits a confirmation to the user that the control parameters were successfully added or changed to the core account. The confirmation may be in the form of a display on a display screen, an e-mail, an SMS message, or an audio confirmation. In some embodiments, step 810 is optional.

In still further embodiments, the user may set or modify the control parameters associated with the core account or control parameters associated with a child product. In one embodiment, the user may log-in to an account management webpage to set or modify the control parameters of the core account or the control parameters associated with the child product. In other embodiments, the user may set or modify the control parameters via an SMS message, an e-mail message, or via a voice recognition system, as described below in FIGS. 8B-8D. According to various embodiments, the user can create, modify, suspend, resume, or delete one or more control parameters associated with a child product and/or a core account. In addition, in some embodiments, the user can create or delete one or more child products and/or core accounts.

Figure 8B:
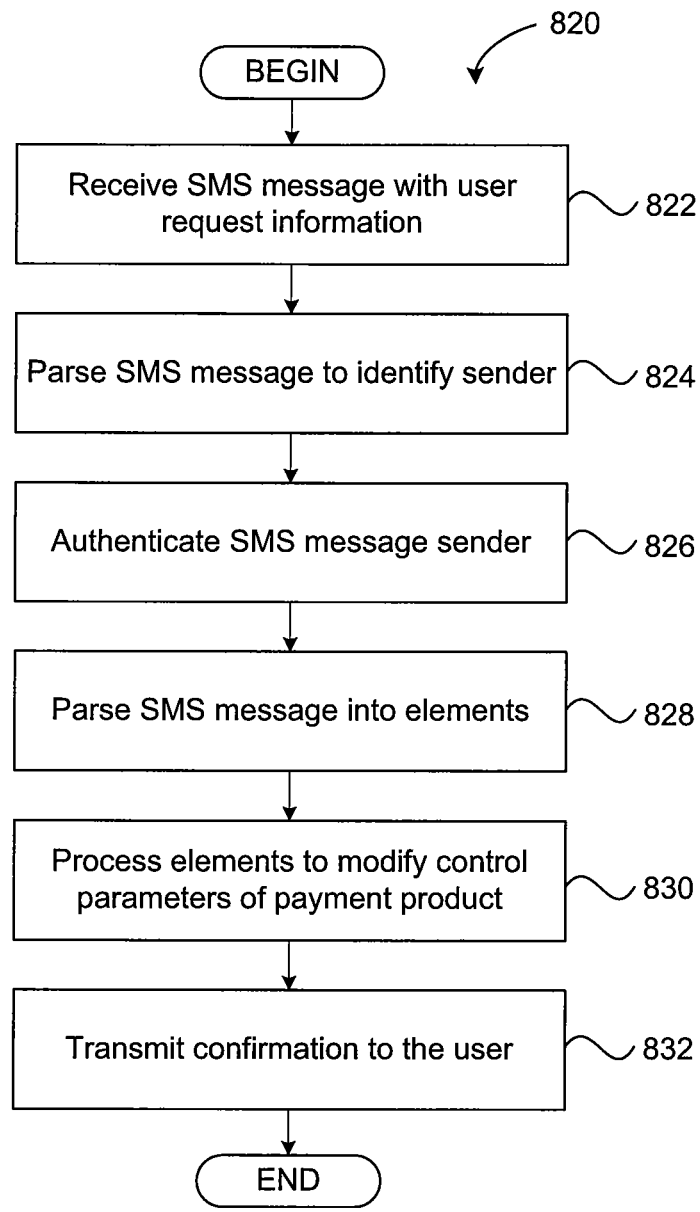
FIG. 8B is flow diagram of method steps for setting up or modifying the control parameters of a core account or a child product via SMS message, according to one embodiment of the invention.

FIG. 8B is flow diagram of method steps for setting up or modifying the control parameters of a core account or a child product via SMS message, according to one embodiment of the invention. Persons skilled in the art will understand that, even though the method 820 is described in conjunction with the systems of FIGS. 1-2 and 4-6, any system configured to perform the steps of the method 820 illustrated in FIG. 8B, in any order, is within the scope of the present invention.

As shown, the method 820 begins at step 822, where the payment processing platform 110 receives an SMS message from a user. The SMS message includes instructions for setting up or modifying control parameters of a core account or a child product that is associated with the user. In a particular embodiment, the SMS message is delivered to the payment processing platform 110 via a standard SMS short code service.

At step 824, payment processing platform 110 parses the received SMS message to identify the user. For example, the phone number of the user can be extracted from the header of the SMS message. Alternatively, user identification may be included in the body of the message. In some embodiments, the user may change the SMS account management settings to require that a security code is included in the SMS message. In some embodiments the financial institution 612 may mandate the provision of a security code. In these embodiments, the user would be required to include a security code in the body of the SMS message to modify the control parameters. If this additional security requirement is active, then the payment processing platform 110 may extract the security code by parsing the body of the SMS message.

At step 826, the payment processing platform 110 authenticates the user. In one embodiment, the payment processing platform 110 authenticates the user by checking the extracted phone number against a database of phone numbers of registered users. In further embodiments, if the user is required to have a security code, then the security code is also checked against the security code stored in a database of registered users. If the user cannot be properly authenticated, then the control parameter modification request is denied and the method 820 terminates. In some embodiments, a denial message may be transmitted to the user. In other embodiments, an entity other than the payment processing platform 110, such as the financial institution 106, authenticates the user. If at step 826 the user is properly authenticated, then the method proceeds to step 828.

At step 828, the payment processing platform 110 parses the body of the SMS message to identify elements of an instruction to setup or modify one or more control parameters associated with a core account or a child product. In a particular embodiment, the body of the SMS message includes one or more elements, such as a security code, a child product number or a core account number, an action command, a control parameter element, and/or a control parameter value. If additional security measures are desirable, the user may instead provide a subset of the account number or the account nickname, as described in detail below. The child product number/nickname or the core account number/nickname references a particular account that is to be set or modified by the action command, the control parameter element, and the control parameter value. Action commands may include, but are not limited to, setting up or modifying the control parameters of a core account or a child product, creating a child product, cancelling or deleting a core account or a child product, suspending a core account or a child product, or resuming a core account or a child product. Control parameter elements may include, but are not limited to, the control parameters described at step 304 in FIG. 3A, such as card limit, expiration date, activation date, country of use, and merchant of use, and the like.

For example, a user may possess an SMS-enabled cellular phone. The cellular phone has been assigned the phone number 555-555-5555 by a cellular phone service provider. The user creates a new SMS message on the SMS-enabled cellular phone and specifies the appropriate destination contact number of the payment processing platform 110, such as short code "12345." The user then inputs an instruction for control parameter modification into the body of the new SMS message with the following format:

<Security Code>, <Core Account Number or a Child Product Number>, <Action Command>, <Control Element>, <Control Value>

For example, the body of the SMS message may be "2839, 0000-1111-2222-3333, Modify, Country Of Use, Mexico", where "2839" is the security code, "0000-1111-2222-3333" is the account number for which the "Country Of Use" control parameter is "Modified" to "Mexico." At step 830, the payment processing platform 110 processes elements included in the instruction to set or modify the one or more control parameters. Accordingly, the core account or the child product is updated to reflect the one or more changes.

At step 832, the payment processing platform 110 transmits a confirmation to the user that the control parameters were successfully added to the core account. The confirmation may be in the form of an SMS reply message. The SMS reply message is addressed to the phone number that requested the control parameter modification via SMS message. Additionally, the SMS reply message may also be sent to one or more auxiliary phone numbers associated with the core account, e.g., a parent's or co-worker's mobile phone. The body of the SMS reply message may include the results of processing the request. In some embodiments, step 832 is optional.

The method steps 820 describe an embodiment in which control parameter set up or modifications are received via a single SMS message. In an alternative embodiment, a series of SMS messages may be communicated between the payment processing platform 110 and the user. For example, the user may route a first SMS message including an indication of the account number to be modified. In response, the payment processing platform 110 may transmit an SMS that includes a list of parameters that may be set up or modified, thereby enabling the user to more easily remember the set up or modification options that are available to him or her. This process may be divided into any number of steps involving single or multiple parameters being transferred in each SMS message.

Figure 8C:
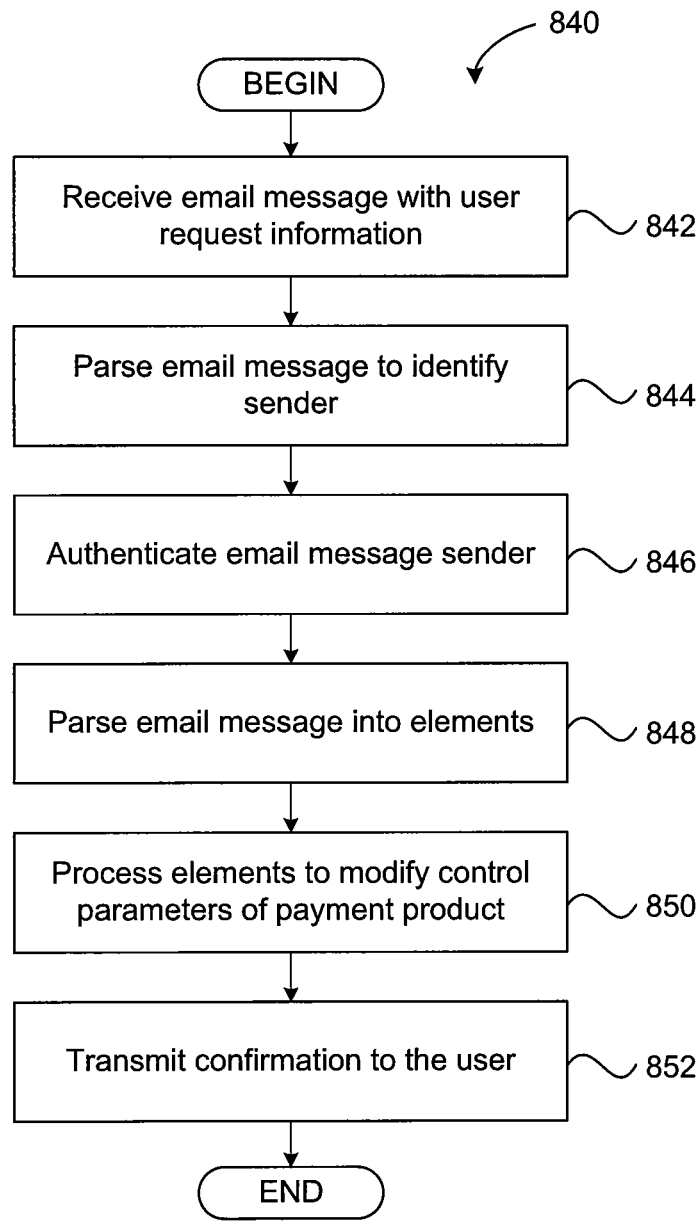
FIG. 8C is flow diagram of method steps for setting up or modifying the control parameters of a core or a child product via e-mail, according to one embodiment of the invention.

FIG. 8C is flow diagram of method steps for setting up or modifying the control parameters of a core account or a child product via e-mail, according to one embodiment of the invention. Persons skilled in the art will understand that, even though the method 840 is described in conjunction with the systems of FIGS. 1-2 and 4-6, any system configured to perform the steps of the method 840 illustrated in FIG. 8C, in any order, is within the scope of the present invention.

As shown, the method 840 begins at step 842, where the payment processing platform 110 receives an e-mail message from a user. The e-mail message includes instructions for setting up or modifying control parameters of a core account or a child product that is associated with the user. In a particular embodiment, the e-mail message is delivered to the payment processing platform 110 via a standard e-mail protocol such as IMAP (Internet Message Access Protocol), POP (Post Office Protocol), or the like.

At step 844, payment processing platform 110 parses the received e-mail message to identify the e-mail address of the user. The e-mail address of the user can be extracted from the header of the e-mail message. In some embodiments, the user may change the e-mail account management settings to require that a security code is included in the e-mail message. In some embodiments, the financial institution 612 may mandate a security code. This security code may be established via several methods, including receiving a specification of the security code when the core account or child account is created. In these embodiments, the user would be required to include a security code in the subject line and/or body of the e-mail message to modify the control parameters. If this additional security requirement is active, then the payment processing platform 110 may extract the security code by parsing the subject line and/or body of the e-mail message.

At step 846, the payment processing platform 110 authenticates the user. In one embodiment, the payment processing platform 110 authenticates the user by checking the extracted e-mail address against a database of e-mail addresses of registered users. In further embodiments, if the security code is required, then the security code is also checked against the security code stored in a database of registered users. In still further embodiments, to complete the authentication step 846, a secondary authentication may be required of the user. For example, upon authentication of the security code, the user may be required to reply with a temporary verification code that is transmitted via an SMS message to a mobile phone number associated with the user. In another example, the temporary verification code may be read to the user by an automated message over a call made to the mobile phone number associated with the user. If the user cannot be properly authenticated, then the control parameter modification request is denied and the method 840 terminates. In some embodiments, a denial message may be transmitted to the user. In other embodiments, an entity other than the payment processing platform 110, such as the financial institution 106, authenticates the user. If at step 846 the user is properly authenticated, then the method proceeds to step 848.

At step 848, the payment processing platform 110 parses the body of the e-mail message to identify elements of an instruction to set up or modify one or more control parameters associated with a core account or a child product. In a particular embodiment, the body of the e-mail message includes one or more elements, such as a security code, a child product number or a core account number, an action command, a control parameter element, and/or a control parameter value. If additional security measures are desirable, the user may instead provide a subset of the account number or the account nickname, as described in detail below. The child product number/nickname or the core account number/nickname references a particular account that is to be modified by the action command, the control parameter element, and the control parameter value. Action commands may include, but are not limited to, setting up or modifying the control parameters of a core account or a child product, creating a child product, cancelling or deleting a core account or a child product, suspending a core account or a child product, or resuming a core account or a child product. Control parameter elements may include, but are not limited to, the control parameters described at step 304 in FIG. 3A, such as card limit, expiration date, activation date, country of use, and merchant of use, and the like. Control parameter values correspond to an updated "amount" value for the control parameter.

For example, a user may possess an e-mail-enabled device, such as a personal computer or mobile phone. The e-mail-enabled device is able to access the e-mail address "sam@smith.com." The user creates a new e-mail message on the e-mail-enabled device and specifies the appropriate destination e-mail address of the payment processing platform 110, such as the e-mail address "modifications@payment_processing_platform.com." The user then inputs an instruction for control parameter set up or modification into the body of the new e-mail message with the following format:

<Security Code>, <Core Account Number or a Child Product Number>, <Action Command>, <Control Element>, <Control Value>

For example, the body of the e-mail message may be "2839, 0000-1111-2222-3333, Modify, Card Limit, "$2000", where "2839" is the security code, "0000-1111-2222-3333" is the account number for which the "Card Limit" control parameter is "Modified" to "$2000." Alternatively, the user may provide a subset of the numbers in an account number, e.g., "3333," or the user may provide a nickname for the account, e.g., "Travel_Card." At step 850, the payment processing platform 110 processes elements included in the instruction to set up or modify the one or more control parameters. Accordingly, the core account or the child product is updated to reflect the one or more changes.

At step 852, the payment processing platform 110 transmits a confirmation to the user that the control parameters were successfully added to the core account. The confirmation may be in the form of an e-mail reply message. The e-mail reply message is addressed to the e-mail address and/or one or more additional e-mail addresses that are associated with the e-mail address that requested the control parameter modification via e-mail message. The body of the e-mail reply message may include the results of processing the request. In some embodiments, step 852 is optional.

Figure 8D:
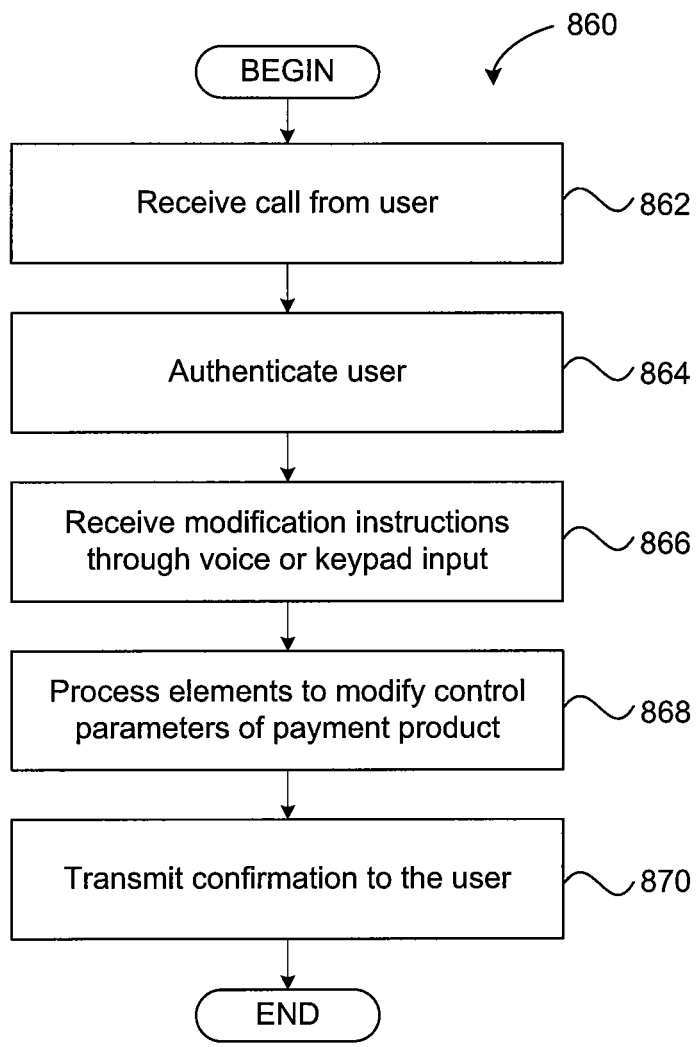
FIG. 8D is flow diagram of method steps for setting up or modifying the control parameters of a core or a child product via interactive voice response (IVR) system, according to one embodiment of the invention.

FIG. 8D is flow diagram of method steps for setting up or modifying the control parameters of a core account or a child product via interactive voice response (IVR) system, according to one embodiment of the invention. Persons skilled in the art will understand that, even though the method 860 is described in conjunction with the systems of FIGS. 1-2 and 4-6, any system configured to perform the steps of the method 860 illustrated in FIG. 8D, in any order, is within the scope of the present invention.

As shown, the method 860 begins at step 862, where an IVR system coupled to the payment processing platform 110 receives a call from a user. The user can call the IVR system via any voice capable device, such as a landline, cellular phone, voice over IP network (VoIP) phone, or the like.

At step 864, payment processing platform 110 identifies the phone number of the voice capable device, if available, through caller ID. If the user has blocked the caller ID feature on his or her voice capable device, then the phone number may be spoken to the IVR system or entered by the user using keypad touchtones. The user may optionally choose to submit a security code, via touch-pad keys included in the voice capable device, to include an additional anti-fraud check. For example, in a particular embodiment, the user may change the IVR account management settings to require that a security code is provided when accessing the payment processing platform 110 to modify control parameters associated with a core account or a child product. If the user cannot be properly authenticated, then the control parameter modification request is denied and the method 860 terminates. In some embodiments, a denial message may be transmitted to the user. In other embodiments, an entity other than the payment processing platform 110, such as the financial institution 106, authenticates the user. If at step 864 the user is properly authenticated, then the method proceeds to step 866.

At step 866, the payment processing platform 110 receives modification instructions from the user through voice or keypad entry. It should be noted that the IVR system may accept both dictation inputs as well as keypad touch-tone inputs. In a particular embodiment, the IVR system prompts the user to begin the instruction by specifying a core account or a child product number to be set up or modified. The IVR responds to the user with confirmation of the core account or a child product input, and then requests the entry of a desired action command. Action commands may include, but are not limited to, setting up or modifying the control parameters of a core account or a child product, creating a child product, cancelling or deleting a child product, suspending a core account or a child product, and/or resuming a core account or a child product. The IVR then responds to the user with confirmation of the action command, and requests the entry of an associated control parameter element. Control parameter elements may include, but are not limited to, the control parameters of step 304 at FIG. 3A, such as card limit, expiration date, activation date, country of use, and merchant of use, and the like. The IVR system next responds to the user with confirmation of the control parameter element, and finally requests the entry of a control value associated with the control parameter element. Control parameter values correspond to an updated "amount" value for the control parameter. Upon entry of the control parameter value, the entire instruction for control parameter modification may be recited back to the user for confirmation. The user may then choose to execute or cancel the instruction.

At step 868, the payment processing platform 110 processes elements included in the instruction to modify the one or more control parameters. Accordingly, the core account or the child product is updated to reflect the one or more changes. At step 870, the payment processing platform 110 transmits a confirmation to the user that the control parameters were successfully added to the core account. The confirmation may be in the form of an audio message. In some embodiments, step 870 is optional.

Figure 8E:
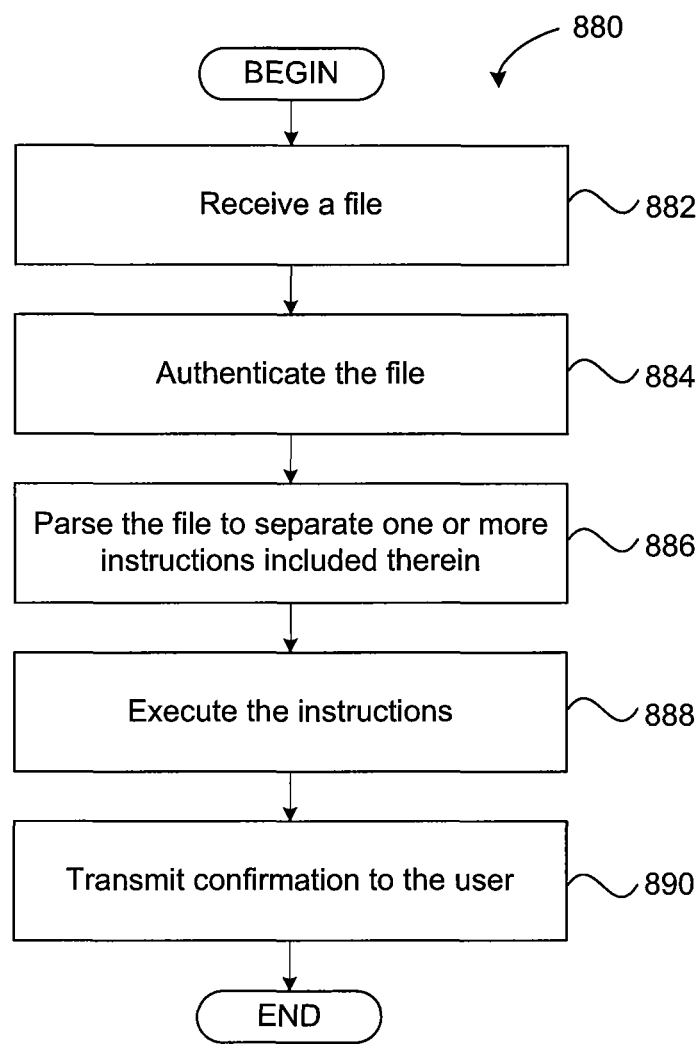
FIG. 8E is flow diagram of method steps for managing one or more core or child products using a file, according to one embodiment of the invention.

FIG. 8E is flow diagram of method steps for managing one or more core or child products using a file, according to one embodiment of the invention. Persons skilled in the art will understand that, even though the method 880 is described in conjunction with the systems of FIGS. 1-2 and 4-6, any system configured to perform the steps of the method 880 illustrated in FIG. 8E, in any order, is within the scope of the present invention.

As shown, the method 880 begins at step 882, where the payment processing platform 110 receives a file from a user. The user can transmit the file using various techniques including, but not limited to, secure FTP, web-page upload forms, email attachments, or the like. In one embodiment, the file includes plain-text instructions that may be easily generated and modified by the user via a text-editor. In another embodiment, the file includes binary data that is representative of one or more instructions.

At step 884, the payment processing platform 110 authenticates the file using any of the techniques described herein, i.e., by verifying user information included in the file, by verifying the entity that is submitting the file, through key exchanges, or the like. In other embodiments, an entity other than the payment processing platform 110, such as the financial institution 106, authenticates the file. At step 886, the payment processing platform 110 parses the file to separate one or more instructions included therein. Here, the instructions may specify any management operations that are applicable to core or child accounts, and the control parameters associated therewith. For example, a particular file can include a first instruction that creates a new child account, a second instruction that modifies control parameters associated with a core account, and a third instruction that deletes an additional child account.

At step 888, the payment processing platform 110 executes each of the instructions included in the file. At step 890, the payment processing platform 110 transmits a confirmation to the user. In one embodiment, the confirmation includes an itemized list of the instructions included in the file, where the confirmation further indicates whether each instruction was successfully executed. The method 880 then terminates.

According to various embodiments, the techniques described in FIGS. 8A-8E for creating and/or modifying one or more control parameters apply equally well to both child products as well as core accounts.

Figure 9:
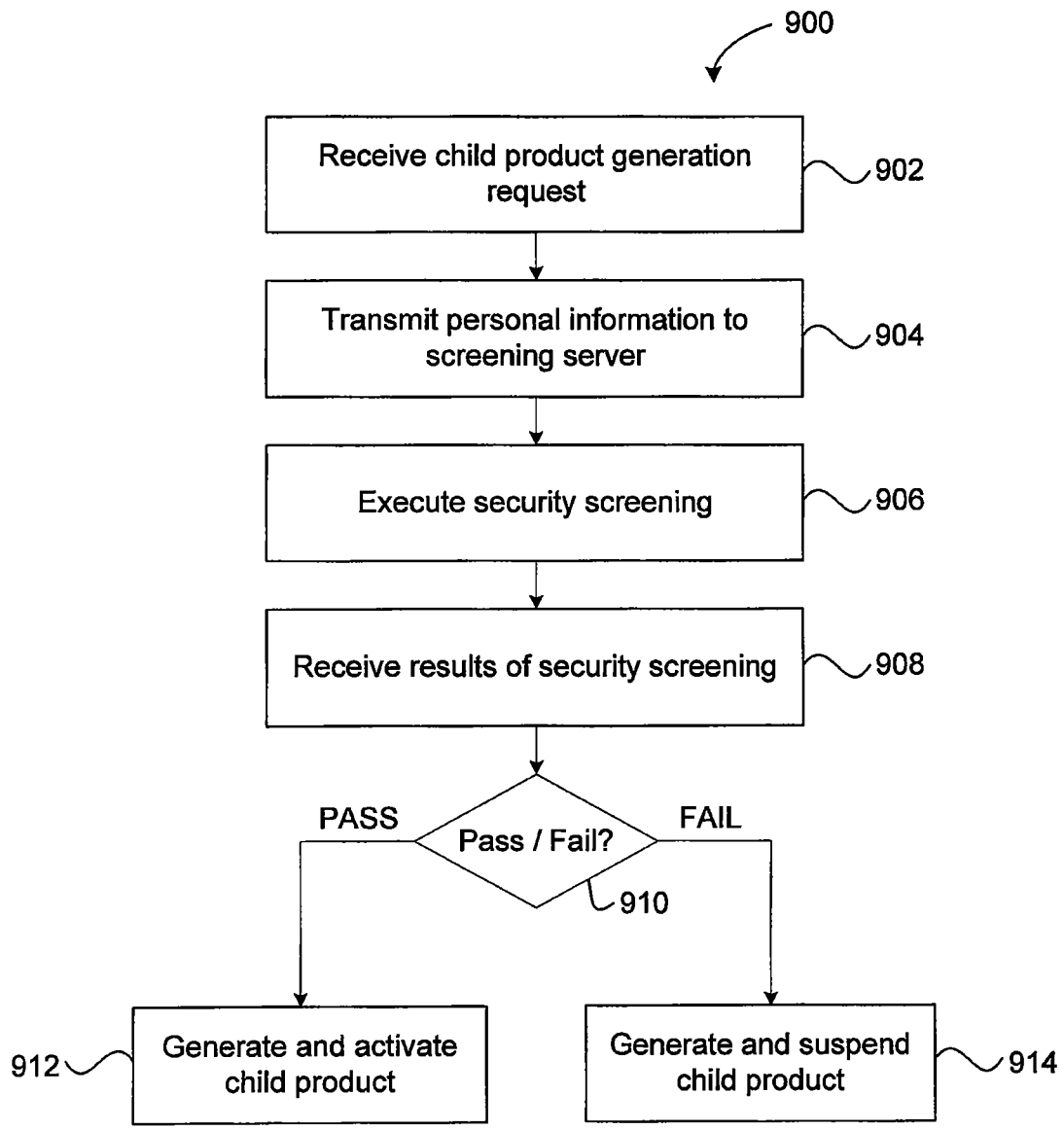
FIG. 9 is flow diagram of method steps for performing a screening of an individual when generating a child product, according to one embodiment of the invention.

FIG. 9 is flow diagram of method steps for performing a screening check of an individual when generating a child product, according to one embodiment of the invention. This screening check may be performed, for example, using a Know Your Customer (KYC) screening, an Anti-Money Laundering (AML) screening, or an Office of Foreign Assets Control (OFAC) screening. Persons skilled in the art will understand that, even though the method 900 is described in conjunction with the systems of FIGS. 1-2 and 4-6, any system configured to perform the steps of the method 900 illustrated in FIG. 9, in any order, is within the scope of the present invention.

As shown, the method 900 begins at step 902, where the payment processing platform 110 receives a user request to create a child product associated with a core account. Child products may be associated with an individual other than the account holder of the core account. In these situations, a screening check may be performed on this other individual. The security check may involve one or more of the following pieces of information: name, a social security number, a date of birth, and mailing address or any additional information required for screening such as employment history, previous mailing address, place of birth, etc.

For example, John Smith is the account holder of a core account and wishes to create a child product for his daughter, Sarah Smith. Sarah Smith has the social security number 111-22-3333, an address 1234 Madison Avenue, and a birth date of Jan. 1, 1980.

At step 904, the payment processing platform 110 transmits the personal information of the individual to the screening server through a file, a web services call, or the like. In one embodiment, the screening server comprises an OFAC screen/check server. In one embodiment, the core account holder, e.g., John Smith, manually enters the personal information into the payment processing platform 110. In an alternative embodiment, the payment processing platform 110 automatically retrieves the personal information from a database based on the name of the individual. In one embodiment, the payment processing platform connects to the screening server through a single-sign on (SSO) or similar process and then the customer enters the information directly into the screening server. In yet another embodiment the screening server functionality is integrated in the payment processing platform.

At step 906, the screening server receives the personal information of the individual and executes security screening. In one embodiment, the OFAC screen/check server compares the individual against a Specially Designated Nationals (SDN) list to perform the security check. However, additional security list checks can be requested by payment processing platform 110 to strengthen the overall security of the OFAC screen/check. In some embodiments, the personal information of the individual may be transmitted to a third party that performs additional screen, such as anti-terrorist screen or anti-money laundering (AML) screening. At step 908, the payment processing platform 110 receives the results of the security screening. For example, the results may be returned through a web services response, file, SSO, or the like.

At step 910, the payment processing platform 110 determines whether the individual passes the security screening. If the payment processing platform 110 determines that the individual passed the security screening, then the method proceeds to step 912. At step 912, the payment processing platform 110 generates and activates the child product. The child product may then be delivered to the recipient, e.g., Sarah Smith, via any appropriate technique, as described.

If, at step 910, the payment processing platform 110 determines that the individual failed the security screening, then the method proceeds to step 914. For example, an individual may fail the security screening if the OFAC screen/check indicates a potential match on the SDN list and/or any additional lists requested by the payment processing platform 110. At step 914, the process terminates by routing a message to the individual informing him or her of the failed security screening. Additionally, the payment processing platform 110 may be configured to generate and suspend the child product until the individual is manually cleared. For example, the financial institution that issues the core account may perform a manual screening, to eliminate false positives. When the child product is suspended, any transaction attempted with the child product would be denied. However, if and when the individual is cleared manually, the suspension can be lifted from the child product and the child product may be activated and delivered.

One advantage of certain embodiments of the invention is that core accounts can be further secured through the use of control parameters applied to the core accounts. For example, an individual with poor spending habits may apply a weekly spending limit control parameter to his or her core account. In another example, an individual who rarely travels outside a specific geographical region can restrict his or her account to limit only purchases that are made within that specific geographical region to reduce potential fraud. In another example, an individual who rarely shops online can configure the core account to restrict all online shopping transactions. In yet another example is an individual who travels regularly and desires additional travel security applied to his or her core account. Prior to departure, the individual could apply geographical spending limits relative to his or her destination. In the even of card theft, any transactions attempting to charge the compromised account outside of the geographical limits associated with the control parameters would be denied. Additionally, if the individual is traveling to multiple countries, then he or she can update the acceptable geographical locations as the trip progresses using the web, SMS, IVR, or any other technically feasible manner.

Another advantage of certain embodiments of the invention is the mobile management capabilities offered through SMS messaging, e-mail messaging, and IVR systems for set up or modification of control parameters. Such capabilities allow a core account holder to modify the control parameters of both the core accounts and child products under his or her management "on-the-go." For example, a traveling business owner may receive a call from an employee that wants to purchase an emergency replacement device, such as a new hard drive. The traveling business owner could transmit an SMS message to the payment processing platform 110 requesting the creation of a new child product for his or her employee to make the purchase. To ensure that appropriate restrictions are set on the child product, the traveling business owner could include the control parameters of a spending limit equal to the price of a replacement hard drive, along with an expiration date set to terminate the child product in two days. The child product information could then be delivered to the employee to make the purchase. In another example, consider a parent who provides his or her daughter a child product that can only be used from 4:00 PM to 7:00 PM. Continuing with this example, the parent is traveling and needs to allow his or her daughter to make a purchase at 2:00 PM. To enable this access, the parent sends an SMS message to the payment processing platform to accordingly change the control parameters to enable this purchase.

Still another advantage is that additional security is provided when an account holder of a core account creates a child product for another individual via a security screening, e.g., an OFAC screening.

Yet another advantage of the techniques described herein is that setting up or modifying the control parameters of a core account or a child product, creating a child product, cancelling or deleting a child product or core account, suspending a core account or a child product, or resuming a core account or a child product can be performed using existing legacy networks, since financial institutions only need to minimally modify legacy payment processing infrastructure to implement embodiments of the invention.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for modifying control parameters associated with a child financial product that is linked to a core account at a financial institution, the method comprising:
generating, via one or more processors in a payment processing platform separate from a financial institution server, the child financial product that includes a first set of control parameters, wherein each control parameter included in the first set of control parameters includes a control element, a weight value, and a control value;
delivering the child financial product to a user, wherein the core account provides financial backing for the child financial product;
after generating the child financial product, receiving, at the payment processing platform, a first updated set of control parameters for the child financial product, wherein the first updated set of control parameters includes:
an action command,
at least one of the weight value and an updated weight value,
at least an updated control value to replace a first control value included in the first set of control parameters, and
a first control element corresponding to the updated control value; and
modifying, by the payment processing platform, the first set of control parameters based on the first updated set of control parameters to generate a modified set of control parameters,
wherein the child financial product is configured to be used for one or more payment transactions, and
further wherein the payment processing platform is configured to restrict approval of the one or more payment transactions based on determining that the one or more payment transactions satisfying the modified set of control parameters causes a sum of weight values included in the modified set of control parameters to exceed a threshold value.

2. The method of claim 1, wherein the first updated set of control parameters are received from a user or from a financial institution.

3. The method of claim 1, further comprising authenticating, by the payment processing platform, the user before modifying the first set of control parameters.

4. The method of claim 1, wherein the first updated set of control parameters further includes an account number identifier for the child financial product.

5. The method of claim 1, wherein the action command comprises one of a create, modify, suspend, resume, or delete command.

6. The method of claim 4, further comprising authenticating, by the payment processing platform, the user by:
receiving a short message service (SMS) message; and
comparing a first phone number that is associated with the SMS message to a second phone number that is associated with the user.

7. The method of claim 6, wherein authenticating the user further comprises comparing a first security code included in the SMS message to a second security code that is associated with the user.

8. The method of claim 1, further comprising authenticating, by the payment processing platform, the user by:
receiving an e-mail message that includes the first set of updated control parameters; and
comparing a first e-mail address that is associated with the e-mail message to a second e-mail address that is associated with the user.

9. The method of claim 8, wherein authenticating the user further comprises comparing a first security code included in the e-mail message to a second security code that is associated with the user.

10. The method of claim 1, wherein the child financial product includes a card number having a bank identification number (BIN) that is based on an account type associated with the core account.

11. The method of claim 1, wherein the core account comprises one of a checking account, a savings account, a home equity account, a money market account, a debit card account, a prepaid card account, a gift card account, a healthcare savings account, an educational savings account, a credit card account, an employee benefits account, a rewards account, a billing account, or a promotion fund account.

12. The method of claim 1, wherein the child financial product comprises a resettable card and the first updated set of control parameters includes a reset frequency associated with the resettable card.

13. One or more non-transitory computer-readable storage media storing instructions that, when executed by one or more processors, cause the one or more processors to modify control parameters associated with a child financial product that is linked to a core account at a financial institution, by performing the steps of:

generating, via one or more processors in a payment processing platform separate from a financial institution server, the child financial product that includes a first set of control parameters, wherein each control parameter included in the first set of control parameters includes a control element, a weight value, and a control value;

delivering the child financial product to a user, wherein the core account provides financial backing for the child financial product;

after generating the child financial product, receiving, at the payment processing platform, a first updated set of control parameters for the child financial product, wherein the first updated set of control parameters includes:
an action command,
at least one of the weight value and an updated weight value,
at least an update control value to replace a first control value included in the first set of control parameters,
a first control element corresponding to the updated control value; and modifying, by the payment processing platform, the first set of control parameters based on the first updated set of control parameters to generate a modified set of control parameters, wherein the child financial product is configured to be used for one or more payment transactions, and further wherein the payment processing platform is configured to restrict approval of the one or more payment transactions based on determining that the one or more payment transactions satisfying the modified set of control parameters causes a sum of weight values included in the modified set of control parameters to exceed a threshold value.

14. The one or more non-transitory computer-readable storage media of claim 13, wherein the first updated set of control parameters are received from a user or from a financial institution.

15. The one or more non-transitory computer-readable storage media of claim 13, further comprising instructions that, when executed by the one or more processors, cause the one or more processors to perform the step of authenticating, by the payment processing platform, the user before modifying the first set of control parameters.

16. The one or more non-transitory computer-readable storage media of claim 13, wherein the first updated set of control parameters further includes an account number identifier for the child financial product.

17. The one or more non-transitory computer-readable storage media of claim 16, further comprising instructions that, when executed by the one or more processors, cause the one or more processors to perform the step of authenticating the user by comparing a phone number associated with the short message service (SMS) message to a phone number associated with the user.

18. The one or more non-transitory computer-readable storage media of claim 17, further comprising instructions that, when executed by the one or more processors, cause the one or more processors to perform the step of authenticating, by the payment processing platform, the user by:
receiving a short message service (SMS) message; and
comparing a first security code included in the SMS message to a second security code that is associated with the user.

19. The one or more non-transitory computer-readable storage media of claim 13, wherein the action command comprises one of a create, modify, suspend, resume, or delete command.

20. The one or more non-transitory computer-readable storage media of claim 13, further comprising instructions that, when executed by the one or more processors, cause the one or more processors to perform the step of authenticating, by the payment processing platform, the user by:
receiving an e-mail message that includes the first set of updated control parameters; and
comparing a first e-mail address that is associated with the e-mail message to a second e-mail address that is associated with the user.

21. The one or more non-transitory computer-readable storage media of claim 20, wherein authenticating the user further comprises comparing a first security code included in the e-mail message to a second security code that is associated with the user.

22. The one or more non-transitory computer-readable storage media of claim 13, wherein the child financial product includes a card number having a bank identification number (BIN) that is based on an account type associated with the core account.

23. The one or more non-transitory computer-readable storage media of claim 13, wherein the core account comprises one of a checking account, a savings account, a home equity account, a money market account, a debit card account, a prepaid card account, a gift card account, a healthcare savings account, an educational savings account, a credit card account, an employee benefits account, a rewards account, a billing account, or a promotion fund account.

24. A computer system, comprising:
a processor; and
a memory storing instructions that, when executed by the processor, cause the computer system to modify control parameters associated with a child financial product that is linked to a core account at a financial institution, by performing the steps of:
generating, via one or more processors in a payment processing platform separate from a financial institution server, the child financial product that includes a first set of control parameters, wherein each control parameter included in the first set of control parameters includes a control element, a weight value, and a control value;
delivering the child financial product to a user, wherein the core account provides financial backing for the child financial product;
after generating the child financial product, receiving, at the payment processing platform, a first updated set of control parameters for the child financial product, wherein the first updated set of control parameters includes:
an action command,
at least one of the weight value and an updated weight value,
at least an updated control value to replace a first control value included in the first set of control parameters, and
a first control element corresponding to the updated control value; and modifying, by the payment processing platform, the first set of control parameters based on the first updated set of control parameters to generate a modified set of control parameters, wherein the child financial product is configured to be used for one or more payment transactions, and further wherein the payment processing platform is configured to restrict approval of the one or more payment transactions based on determining that the one or more payment transactions satisfying the modified set of control parameters causes a sum of weight values included in the modified set of control parameters to exceed a threshold value.

25. The computer system of claim 24, wherein the first updated set of control parameters are received from a user or from a financial institution.

26. A computer-implemented method for adding control parameters to a core account, the method comprising:

receiving a selection of the core account, wherein the core account is held with a financial institution;

receiving a first set of control parameters, wherein each control parameter included in the first set of control parameters includes a control element, a weight value and a control value, and wherein the selection of the core account and the first set of control parameters are received from a user or from a financial institution;

associating, via one or more processors, the first set of control parameters with the core account;

generating, via a payment processing platform separate from a financial institution server, a child financial product;

delivering, via the payment processing platform, the child financial product to the user, wherein the core account provides financial backing for the child financial product;

receiving, at the payment processing platform, a second set of control parameters including:
an action command,
at least one of the weight value and an updated weight value,
an updated control value to replace a first control value included in the first set of control parameters, and
a first control element corresponding to the updated control value; and modifying, by the payment processing platform, the first set of control parameters based on the second set of control parameters to generate a modified set of control parameters, wherein the child financial product is configured to be used for one or more payment transactions, and further wherein the payment processing platform is configured to restrict approval of the one or more payment transactions based on determining that the one or more payment transactions satisfying the modified set of control parameters causes a sum of weight values included in the modified set of control parameters to exceed a threshold value.

27. The method of claim 26, further comprising authenticating the user before modifying the first set of control parameters.

28. The method of claim 26, wherein the second set of control parameters further includes an account number identifier for the financial product.

29. The method of claim 28, further comprising authenticating the user by:

receiving a short message service (SMS) message; and comparing a first phone number that is associated with the SMS message to a second phone number that is associated with the user.

30. The method of claim 29, wherein the step of authenticating the user further comprises comparing a first security code included in the SMS message to a second security code that is associated with the user.

31. The method of claim 26, further comprising authenticating the user by:

receiving an e-mail message that includes the second set of control parameters; and comparing a first e-mail address that is associated with the e-mail message to a second e-mail address that is associated with the user.

32. The method of claim 31, wherein authenticating the user further comprises comparing a first security code included in the e-mail message to a second security code that is associated with the user.

33. The method of claim 26, further comprising authenticating the user by:

receiving, via an interactive voice response (IVR), the second set of control parameters; and comparing, to a first phone number that is associated with the user, a second phone number that is associated with a phone being used to communicate with the IVR.

34. The method of claim 26, wherein a first control element is one of a country of use parameter, a merchant parameter, a merchant category parameter, a time of day parameter, a day of week parameter, a date of month parameter, a reset frequency parameter, or a channel of usage parameter.

* * * * *